US011291032B2

(12) United States Patent
Yeo et al.

(10) Patent No.: US 11,291,032 B2
(45) Date of Patent: *Mar. 29, 2022

(54) METHOD AND APPARATUS FOR DECODING DOWNLINK CONTROL SIGNAL IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Jinyoung Oh, Seoul (KR); Sungjin Park, Incheon (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/098,972

(22) Filed: Nov. 16, 2020

(65) Prior Publication Data

US 2021/0068141 A1    Mar. 4, 2021

Related U.S. Application Data

(63) Continuation of application No. 16/465,375, filed as application No. PCT/KR2017/011844 on Oct. 25, 2017, now Pat. No. 10,841,940.

(30) Foreign Application Priority Data

Dec. 6, 2016  (KR) .................. 10-2016-0165255

(51) Int. Cl.
*H04W 72/12*    (2009.01)
*H04L 1/18*    (2006.01)
*H04L 5/14*    (2006.01)

(52) U.S. Cl.
CPC ....... *H04W 72/1284* (2013.01); *H04L 1/1812* (2013.01); *H04L 5/14* (2013.01); *H04W 72/1247* (2013.01)

(58) Field of Classification Search
CPC ......... H04W 72/1284; H04W 72/1247; H04W 72/04; H04L 1/1812; H04L 5/14; H04L 1/1896; H04L 1/1854; H04L 5/00
See application file for complete search history.

(56) References Cited

U.S. PATENT DOCUMENTS 8,953,541 B2    2/2015  Jang
9,929,834 B2 *  3/2018  Chen .................... H04L 1/1887
(Continued)

FOREIGN PATENT DOCUMENTS

WO    WO 2016/117885    7/2016

OTHER PUBLICATIONS

Elsaadany, Mahmoud, Abdelmohsen Ali, and Walaa Hamouda. "Cellular LTE—A technologies for the future Internet-of-Things: Physical layer features and challenges." IEEE Communications Surveys & Tutorials 19.4 (2017): 2544-2572. (Year: 2017).*

(Continued)

*Primary Examiner* — Sharad Rampuria
(74) *Attorney, Agent, or Firm* — The Farrell Law Firm, P.C.

(57) ABSTRACT

The present disclosure relates to a communication technique for converging an IoT technology with a 5G communication system for supporting a higher data transmission rate beyond a 4G system, and a system therefor. The present disclosure may be applied to an intelligent service (for example, a smart home, a smart building, a smart city, a smart car or connected car, healthcare, digital education, retail business, a security and safety related service, or the like) on the basis of a 5G communication technology and an IoT related technology. The present invention relates to a wireless communication system and, specifically, to a method and apparatus for decoding a downlink control signal.

20 Claims, 16 Drawing Sheets

(56) References Cited

U.S. PATENT DOCUMENTS

| | | |
|---|---|---|
| 2018/0014301 A1 | 1/2018 | Chen |
| 2018/0084545 A1 | 3/2018 | Hosseini |
| 2018/0115943 A1 | 4/2018 | Park et al. |

OTHER PUBLICATIONS

PCT/ISA/210 Search Report issued on PCT/KR2017/011844, pp. 5.
PCT/ISA/237 Written Opinion issued on PCT/KR2017/011844, pp. 5.
Nokia, Alcatel-Lucent Shanghai Bell, 3GPP TSG-RAN WG1 Meeting #87, R1-1612205, Reno, Nevada (USA), Nov. 14, 2016, Dynamic fallback and required scheduling restrictions for 1ms TTI with different processing times, pp. 7.
Ericsson, 3GPP TSG-RAN WG1 #87, R1-1611502, Reno, USA, Nov. 4, 2016, Reduced processing for 1msTTI, pp. 6.
Samsung, 3GPP TSG RAN WG1 Meeting #87, R1-1612399, Reno, USA, Nov. 4, 2016, Fall-back mode operation for processing time reduction with 1ms TTI, pp. 5.
Sharp, 3GPP TSG RAN WG1 Meeting #87, R1-1612616, Reno, USA, Nov. 4, 2016, Shortened processing time operation for 1ms TTI, pp. 4.
LG Electronics, "Remaining Issues on Shortened Processing Time for 1ms TTI", R1-1609211, 3GPP TSG RAN WG1 Meeting #86bis, Oct. 10-14, 2016, 4 pages.
Huawei, HiSilicon, "Remaining Issues on Shortened Processing Time for 1ms TTI", R1-1611168, 3GPP TSG RAN WG1 Meeting #87, Nov. 14-18, 2016, 6 pages.
Ericsson, "Asynchronous HARQ for PUSCH", R1-1611506, 3GPP TSG-RAN WG1 #87, Nov. 14-18, 2016, 3 pages.
ZTE, "Considerations on Multicast Support for MTC", R1-167320, 3GPP TSG RAN WG1 Meeting #86, Aug. 22-26, 2016, 4 pages.
European Search Report dated Oct. 24, 2019 issued in counterpart application No. 17878448.4-1219, 9 pages.

\* cited by examiner (a)

(b)

(a)

(b)

(a)

(b)

(a)

(b)

(a)

(b)

METHOD AND APPARATUS FOR DECODING DOWNLINK CONTROL SIGNAL IN WIRELESS CELLULAR COMMUNICATION SYSTEM

PRIORITY

This application is a Continuation of U.S. patent application Ser. No. 16/465,375, filed on May 30, 2019, which is a National Phase Entry of PCT International Application No. PCT/KR2017/011844 which was filed on Oct. 25, 2017, and claims priority to Korean Patent Application No. 10-2016-0165255, which was filed on Dec. 6, 2016, the content of each of which is incorporated herein by reference.

TECHNICAL FIELD

The present invention relates to a wireless communication system and a downlink control signal decoding method and apparatus. In particular, the present invention relates to a method for a latency reduction mode-capable terminal to detect a downlink control signal and determine, when the latency reduction mode of the terminal is configured, a feedback timing of an HARQ-ACK corresponding to a downlink signal.

BACKGROUND ART

In order to meet the increasing demand for wireless data traffic since the commercialization of 4$^{th}$ generation (4G) communication systems, the development focus is on the 5$^{th}$ generation (5G) or pre-5G communication system. For this reason, the 5G or pre-5G communication system is called a beyond 4G network communication system or post long-term evolution (LTE) system. Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of FQAM {hybrid frequency shift keying (FSK) and quadrature amplitude modulation (QAM)} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

In order for such a communication system to provide users with multiple services, there is a need of a method and apparatus that is capable of processing the services with different characteristics during a same time period without compromising the service characteristics.

In the legacy LTE system, the HARQ ACK or NACK feedback indicating whether a downlink data transmission succeeds or not is transmitted to the base station in uplink 3 ms after the receipt of the downlink data. For example, the HARQ ACK/NACK corresponding to the physical downlink shared channel (PDSCH) transmitted from a base station to a terminal at subframe n is transmitted to the base station at subframe n+4 via a physical uplink control channel (PUCCH) or a physical uplink shared channel (PUSCH). In an FDD LTE system where a base station transmits downlink control information (DCI) including information on the uplink resource allocated to a terminal and allows for the terminal to request for retransmission via a physical hybrid ARQ indicator channel (PHICH), if the terminal receives an uplink grant at subframe n for scheduling uplink data transmission, it transmits uplink data at subframe n+4. That is, PUSCH transmission is performed at subframe n+4. Unlike the above example directed to the FDD LTE system, the HARQ ACK/NACK transmission timing or PUSCH transmission timing vary according to the uplink-downlink subframe configuration in compliance with a predetermined rule in a TDD LTE system.

DISCLOSURE OF INVENTION

Technical Problem

In the FDD or TDD LTE system, the HARQ ACK/NACK transmission timing or the PUSCH transmission timing is predetermined to secure about the 3 ms that is adequate for a base station or a terminal to process a signal. If the signal processing time of the LTE base station and terminal is reduced to 1 or 2 ms, it may also be possible to reduce the data transmission delay.

When a latency reduction mode transmission-capable terminal is configured to operate in the latency reduction mode, the transmission timing of the HARQ-ACK corresponding to downlink data or the uplink data corresponding to an uplink data grant may vary according to the search space in which DCI is detected. For example, the uplink transmission timing may fall in subframe n+4 for the case where the DCI is detected in a common search space and subframe n+4 for the case where the DCI is detected in a terminal-specific search space. However, it may occur that a search space may be the common search space and the terminal-specific search space simultaneously for a specific terminal; for this case, there is a need of defining the operations of the terminal and base station. The present invention provides a signal transmission/reception method and apparatus that is capable of allowing a terminal to decode a downlink control signal and a base station and the terminal to communicate signals based thereon.

Solution to Problem

In accordance with an aspect of the present invention, a method of a terminal in a wireless communication system includes receiving a control signal scheduling an uplink transmission from a base station, determining whether a timing for transmitting an uplink signal is a first timing or a second timing based on a search space in which the control signal is detected, the second timing being earlier than the first timing, and transmitting the uplink signal to the base station at the first or second timing.

In accordance with another aspect of the present invention, a terminal in a wireless communication system includes a transceiver configured to transmit and receive signals and a controller configured to control to receive a control signal scheduling an uplink transmission from a base station, determine whether a timing for transmitting an uplink signal is a first timing or a second timing based on a search space in which the control signal is detected, the second timing being earlier than the first timing, and transmit the uplink signal to the base station at the first or second timing.

In accordance with another aspect of the present invention, a method of a base station in a wireless communication system includes transmitting a control signal scheduling an uplink transmission to a terminal and receiving an uplink signal from the terminal at both a first timing and a second timing based on a search space to which the control signal is mapped, the second timing being earlier than the first timing.

In accordance with still another embodiment of the present invention, abase station in a wireless communication system includes a transceiver configured to transmit and receive signals and a controller configured to control to transmit a control signal scheduling an uplink transmission to a terminal and receive an uplink signal from the terminal at both a first timing and a second timing based on a search space to which the control signal is mapped, the second timing being earlier than the first timing.

Advantageous Effects of Invention

The present invention is advantageous in terms of improving resource utilization efficiency by providing a method for decoding a control signal and communicating signals between a base station and a terminal based on the decoding result in a latency reduction mode.

MODE FOR THE INVENTION

Figure 1:
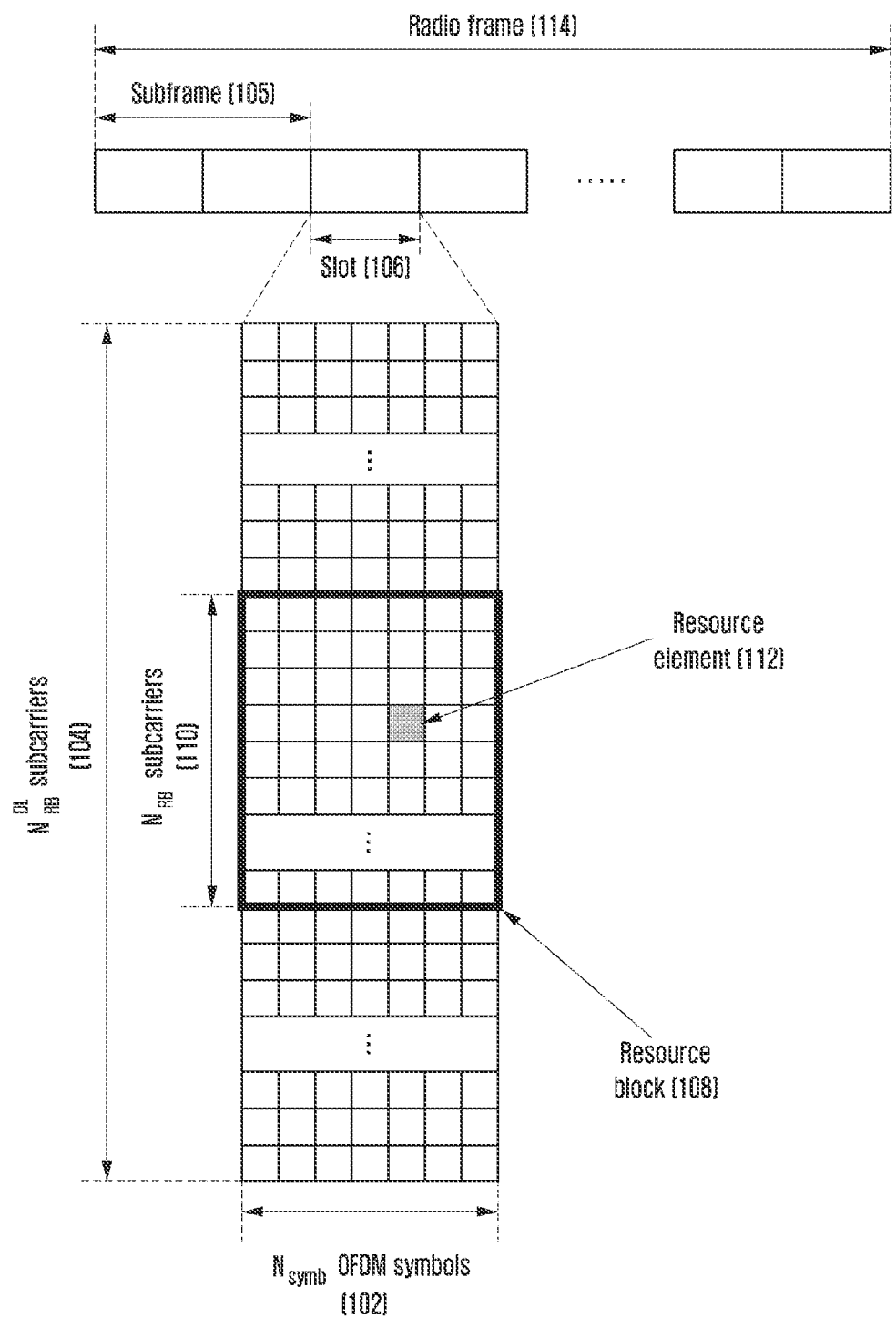
FIG. 1 is a diagram illustrating a basic time-frequency resource structured for transmitting downlink data or control channels in an LTE or LTE-A system.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein; rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

The mobile communication system has evolved to a high-speed, high-quality packet data communication system (such as High Speed Packet Access (HSPA), LTE (or evolved universal terrestrial radio access (E-UTRA)), and LTE-Advanced (LTE-A) defined in the $3^{rd}$ Generation Partnership Project (3GPP), High Rate Packet Data (HRPD) defined in the $3^{rd}$ Generation Partnership Project-2 (3GPP2), Ultra Mobile Broadband (UMB), and 802.16e defined in the IEEE) capable of providing data and multimedia services beyond the early voice-oriented services. Meanwhile, 5G or NR standardization is in progress for 5G wireless communication systems.

Such wireless communication systems including a 5G system may provide a terminal with services falling into at least one of the service categories of enhanced mobile broadband (eMBB), massive machine type communication (mMTC), and ultra-reliable and low-latency communications (URLLC). These services may be provided to a terminal simultaneously during a time period. The eMBB aims at offering high throughputs and high data rates, the mMTC low-power and multiple terminal accesses, and the URLLC high reliabilities and low latencies; however, they are not limited thereto in an embodiment of the present invention. The three types of services are concerned with the main scenarios in the LTE or beyond systems including the 5G/NR system. An embodiment of the present invention is directed to a method and apparatus for supporting coexistence of eMBB and URLLC services or mMTC and URLLC services.

In the case where URLLC service data is to be transmitted in a transmission time interval (TTI) in which the base station has scheduled eMBB service data for a certain terminal, the base station may transmit the URLLC service data in part of the frequency band in which the eMBB service data transmission is scheduled. The terminal scheduled for the eMBB service and the terminal scheduled for URLLC service may be identical with or different from each other. In this case, part of the scheduled eMBB data is not transmitted such that the eMBB data are likely to be damaged. Thus, there is a need of a method for the terminal scheduled for the eMBB service or the terminal scheduled for the URLLC service to receive and process the signal carrying the service data appropriately. According to an embodiment of the present invention, the method for facilitating coexistence of different types of services may make it possible to transmit service-specific information when eMBB service-related information and URLLC service-related information are simultaneously scheduled in part or whole of a frequency band, when mMTC service-related information and URLLC service-related information are simultaneously scheduled in part or whole of the frequency band, or when eMBB service-related information, URLLC service-related information, and mMTC service-related information are simultaneously scheduled.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification. In the following description, the term "base station (BS)" is used to indicate an entity for allocating resources to a terminal, and examples include a g Node B (gNB), an evolved Node B (eNB), a node B, a radio access unit, a base station controller, and a predetermined network node. Examples of the terminal include a user equipment (UE), a mobile station (MS), a cellular phone, a smartphone, a computer, and a multimedia system with a communication function. In the following description, the term "downlink (DL)" denotes a radio transmission path from a base station to a terminal, and the terminal "uplink (UL)" denotes a radio transmission path from the terminal to the base station. Although the description is directed to an LTE or LTE-A system by way of example, the present invention is applicable to other communication systems having a similar technical background and channel format. For example, the present invention is applicable to the 5G mobile communication technology (5G new radio (NR)) under development after LTE-A. It will be understood by those skilled in the art that the present invention can be applied even to other communication systems with a slight modification without departing from the spirit and scope of the present invention.

As one of the representative broadband wireless communication systems, the LTE system uses orthogonal frequency division multiplexing (OFDM) in the downlink and single carrier frequency division multiple access (SC-FDMA) in the uplink. The term 'uplink' denotes a radio transmission path from a terminal (or UE or MS) to a BS (gNB), and the term downlink denotes a radio transmission path from the BS to the terminal. Such multiple access schemes are characterized by allocating the time-frequency resources for transmitting user-specific data and control information without overlap of each other, i.e., maintaining orthogonality, so as to distinguish among user-specific data and control information.

The LTE system adopts a Hybrid Automatic Repeat Request (HARQ) scheme for physical layer retransmission when decoding failure occurs in initial data transmission. An HARQ scheme is designed to operate in such a way that a receiver, when it fails in decoding data, sends a transmitter a negative acknowledgement (NACK) indicative of the decoding failure in order for the transmitter to retransmit the corresponding data on the physical layer. The receiver combines the retransmitted data with the decoding-failed data to improve data reception performance. The HARQ scheme may also be designed to operate in such a way that the receiver, when it succeeds in decoding data, sends the transmitter an Acknowledgement (ACK) indicative of successful decoding in order for the transmitter to transmit new data.

FIG. 1 is a diagram illustrating a basic time-frequency resource structured for transmitting downlink data or control channels in an LTE system.

In FIG. 1, the horizontal axis denotes the time, and the vertical axis denotes the frequency. The smallest transmission unit in the time domain is an OFDM symbol, and $N_{symb}$ OFDM symbols 102 form a slot 106, and 2 slots form a subframe 105. Each slot spans 0.5 ms, and each subframe spans 1.0 ms. A radio frame 114 is a time unit consisting of 10 subframes. In the frequency domain, the smallest transmission unit is a subcarrier, and the total system transmission bandwidth consists of $N_{BW}$ subcarriers 104. However, the specific figures may vary.

In the time-frequency resource structure, the basic resource unit is a Resource Element (RE) indicated by an OFDM symbol index and a subcarrier index. A Resource Block (RB) (or Physical Resource Block (PRB) 108 is defined by $N_{symb}$ consecutive OFDM symbols 102 in the time domain and $N_{RB}$ consecutive subcarriers 110 in the frequency domain. That is, one RB 108 consists of $N_{symb} \times N_{RB}$ REs 112. Typically, the RB is the smallest data transmission unit; in the LTE system, $N_{symb}=7$, $N_{RB}=12$, and $N_{BW}$ and $N_{RB}$ are proportional to the system transmission bandwidth. The data rate increases in proportion to the number of RBs scheduled for the terminal. For the LTE system, 6 transmission bandwidths are defined. In the case of a frequency division duplex (FDD) system in which downlink and uplink are separated in frequency, the downlink transmission bandwidth and uplink transmission bandwidth may differ from each other. The channel bandwidth denotes an RF bandwidth in comparison with the system transmission bandwidth. Table 1 shows the relationship between the system transmission bandwidth and channel bandwidth defined in the LTE standard. For example, an LTE system having 10 MHz channel bandwidth uses the transmission bandwidth of 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information is transmitted in N OFDM symbols at the beginning of the subframe. Typically, N={1, 2, 3}. Accordingly, N value varies at every subframe depending on the control information amount to be transmitted. The control information includes a control channel transmission period indicator for indicating a number of OFDM symbols for conveying the control information, scheduling information for downlink or uplink data transmission, and an HARQ ACK/NACK signal.

In the LTE system, the downlink or uplink data scheduling information is transmitted from the base station to the terminal using Downlink Control Information (DCI). The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least the following information.

Resource allocation type 0/1 flag: Resource allocation type 0/1 flag indicates whether the resource allocation scheme is Type 0 or Type 1. The Type 0 is to allocate resources in units of Resource Block Group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type 0 scheme. A Type-1 is to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block (TB) to be transmitted.

HARQ process number: HARQ process number indicates a process number of HARQ.

New data indicator: New data indicator indicates whether the HARQ transmission is an initial transmission or a retransmission.

Redundancy version (RV): Redundancy version indicates a redundancy version of HARQ.

TPC command for PUCCH: Transmit Power Control (TPC) command for Physical Uplink Control Channel (PUCCH) indicates a power control command for a PUCCH that is an uplink control channel.

After being channel-coded and modulated, the DCI may be transmitted over a Physical Downlink Control Channel (PDCCH, which is interchangeably referred to as control information) or Enhanced PDCCH (EPDCCH, which is interchangeably referred to as enhanced control information).

Typically, the DCI is channel-coded per terminal, scrambled with a radio network temporary identifier (or terminal identifier), cyclic redundancy check-added (CRC-added), and channel-coded in series so as to be transmitted via a corresponding PDCCH. In the time domain, a PDCCH may be mapped to and transmitted during a control channel transmission period. The frequency-domain mapping location of the PDCCH may be determined by an ID of each terminal, and it may be spread throughout the entire system transmission band.

Downlink data may be transmitted over a Physical Downlink Shared Channel (PDSCH) that is a physical channel for downlink data transmission. A PDSCH may be transmitted after the control channel transmission period, and the scheduling information such as the detailed mapping location in the frequency domain and the modulation scheme may be indicated by the DCI that is transmitted via the PDCCH.

Using a 5-bit MCS in the control information constituting the DCI, the base station notifies the terminal of the modulation scheme applied to the PDSCH to be transmitted and the size of data (e.g., Transport Block Size (TBS)) to be transmitted. The TBS corresponds to the size given before channel coding for error correction is applied to the data (e.g., Transport Block (TB)) to be transmitted by the base station.

The modulation schemes supported by the LTE system may include Quadrature Phase Shift Keying (QPSK), 16 Quadrature Amplitude Modulation (QAM), and 64QAM, and they have modulation orders ($Q_m$) 2, 4, and 6, respectively. That is, the QPSK modulation transmits 2 bits per symbol, the 16QAM transmits 4 bits per symbol, and the 64QAM transmits 6 bits per symbol. It may also be possible to use the 256QAM or higher order modulation schemes.

Figure 2:
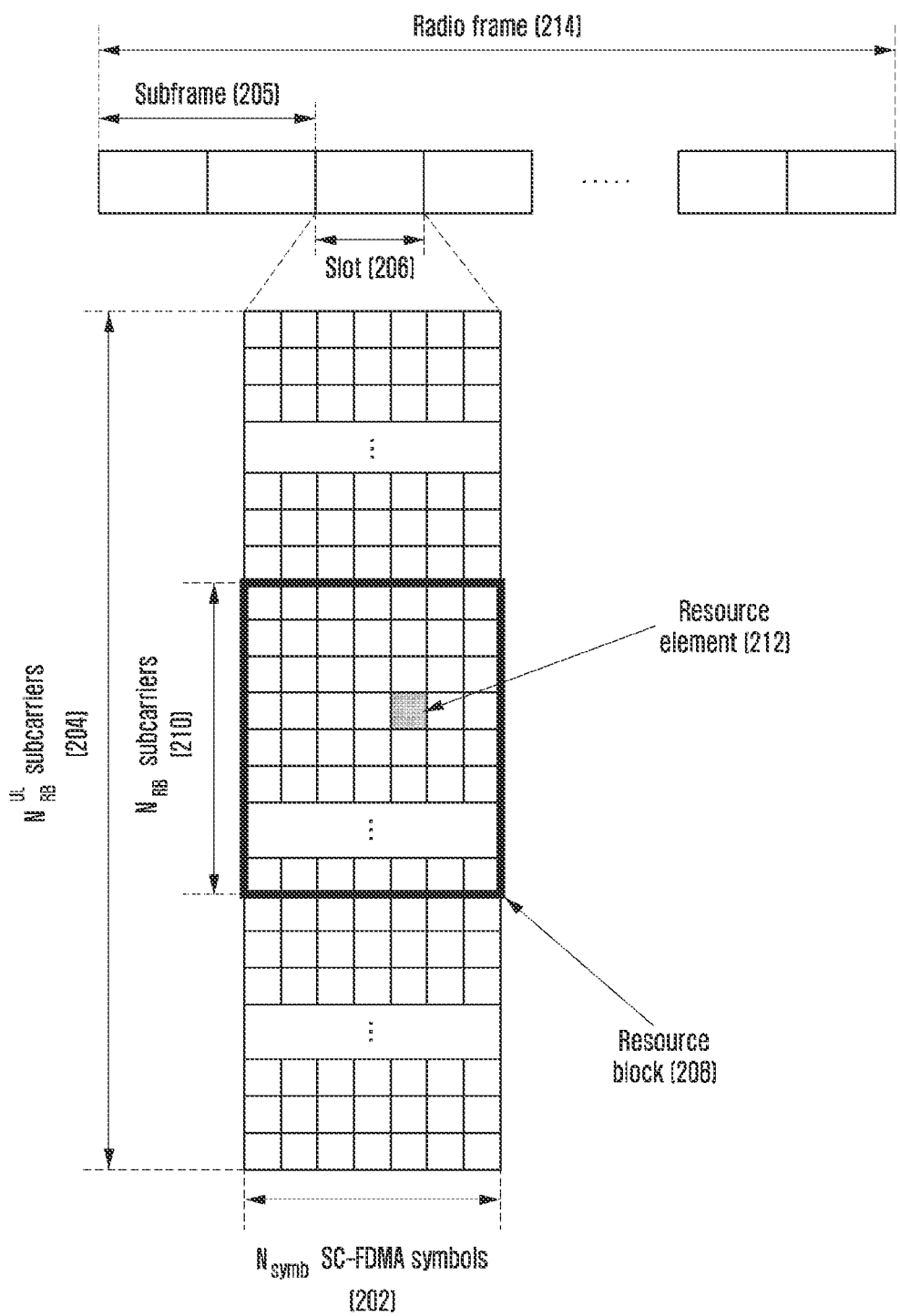
FIG. 2 is a block diagram illustrating a basic time-frequency resource structure for transmitting uplink data or control channels in an LTE or LTE-A system.

FIG. 2 is a block diagram illustrating a basic time-frequency resource structure for transmitting uplink data or control channels in an LTE-A system.

In FIG. 2, the horizontal axis denotes the time, and the vertical axis denotes the frequency. The smallest transmission unit in the time domain is an SC-FDMA symbol, and $N_{symb}^{UL}$ SC-FDMA symbols 202 form a slot 206. Two slots form a subframe 205. The smallest transmission unit in the frequency domain is a subcarrier, and the total system transmission bandwidth consists of $N_{BW}$ subcarriers 204. $N_{BW}$ is proportional with the system transmission bandwidth.

In the time-frequency domain, the basic resource unit is RE 212, and each RE is defined by one SC-FDMA symbol index and one subcarrier index. An RB or PRB 208 is defined by $N_{symb}^{UL}$ consecutive SC-FDMA symbols in the time domain and $N_{sc}^{RB}$ consecutive subcarriers in the frequency domain. Accordingly, one RB consists of $N_{symb}^{UL} \times N_{sc}^{RB}$ REs. Typically, the smallest data or control information transmission unit is an RB. A PUCCH is mapped to a frequency region corresponding to one RB and transmitted during the time period of one subframe.

The LTE standard defines a relationship between the PDSCH or the PDCCH/EPDCCH carrying a semi-persistent scheduling (SPS) release and the PUCCH or physical uplink shared channel (PUSCH) carrying the HARQ ACK/NACK corresponding to the PDSCH, PDCCH, or EPDCCH. For example, in an LTE system operating in the FDD mode, the HARQ ACK/NACK corresponding to the PDSCH or the PDCCH or EPDCCH carrying the SPS release, the PDSCH or the PDCCH or EPDCCH being transmitted at the (n−4)$^{th}$ subframe, is carried in the PUCCH or PUSCH being transmitted at the n$^{th}$ subframe.

The LTE employs an asynchronous HARQ scheme for DL HARQ. That is, if an eNB receives an HARQ NACK for initially transmitted data from a UE, it may freely determine a retransmission timing through a scheduling operation. If the UE fails to decode the received data, it stores the erroneous initial data and combines the buffered data with the retransmitted data.

A UE transmits the HARQ ACK/NACK corresponding to a PDSCH received at subframe n-k to the base station at subframe n, and k is determined differently depending on the duplex mode (i.e., FDD or time division duplex (TDD)) and subframe configuration in use by the LTE system. For example, k is fixed to 4 in the FDD LTE system. Meanwhile, k may vary according to the subframe configuration and subframe index in the TDD LTE system. The value of k may vary with the TDD configuration per carrier when data are transmitted over multiple carriers. In TDD, the value of k is determined according to the TDD UL-DL configuration as shown in Table 2.

TABLE 2

| UL-DL Configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The LTE system employs a synchronous HARQ scheme with a fixed data transmission timing for UL transmission distinct from the DL HARQ. That is, the UL-DL timing relationship between the PUSCH and PDCCH that is followed by the PUSCH and a physical hybrid indicator channel (PHICH) carrying the DL HARQ ACK/NACK corresponding to the PUSCH is fixed according to a rule as follows.

If the UE receives a PDCCH carrying UL scheduling control information or a PHICH carrying a DL HARQ ACK/NACK from the eNB at subframe n, it transmits UL data through a PUSCH at the subframe n+k based on the control information. Here, k is determined differently depending on the duplex mode in use, i.e., FDD or TDD, and its configuration. For example, k is fixed to 4 in the FDD LTE system. Meanwhile, k may vary according to the subframe configuration and subframe index in the TDD LIE system. The value of k may also vary with the TDD configuration per carrier when data are transmitted over multiple carriers. In TDD, the value of k is determined according to the TDD UL-DL configuration as shown in Table 3.

TABLE 3

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5 |

Meanwhile, the PHICH carrying the HARQ ACK corresponding to PUSCH received at subframe i-k is received at subframe i. In the FDD system, k is fixed to 4. That is, the PHICH carrying the HARQ-ACK corresponding to the PUSCH received at subframe i-k is transmitted at subframe i in the FDD system. In the TDD system, if a UE configured with no EIMTA has one serving cell or multiple serving cells with the same TDD UL-DL configurations, the value of k may be given for TDD UL-DL configurations 1 to 6 as shown in Table 4.

TABLE 4

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

For example, in TDD UL-DL configuration 1, the PHICH being transmitted at subframe 6 may carry the HARQ ACK corresponding to the PUSCH transmitted at subframe 2 that is 4 subframes earlier.

In TDD UL-DL configuration 0, if the HARQ ACK is received on the PHICH resources corresponding to IPHICH=0, this means that the HARQ ACK corresponds to the PUSCH transmitted at subframe i-k, and the value of k is given according to Table 4. In the TDD UL-DL configuration 0, if the HARQ ACK is received on the PHICH resources corresponding to IPHICH=1, this means that the HARQ ACK corresponds to the PUSCH transmitted at subframe i-6.

Although the above description is directed to LTE systems, the principle of the present invention is not limited to the LTE systems and may be applicable to other wireless communication systems including 5G NR systems. In the case where the present invention is applied to another wireless communication system, the value of k may be changed in adaptation to the modulation scheme in use for FDD.

Figure 3:
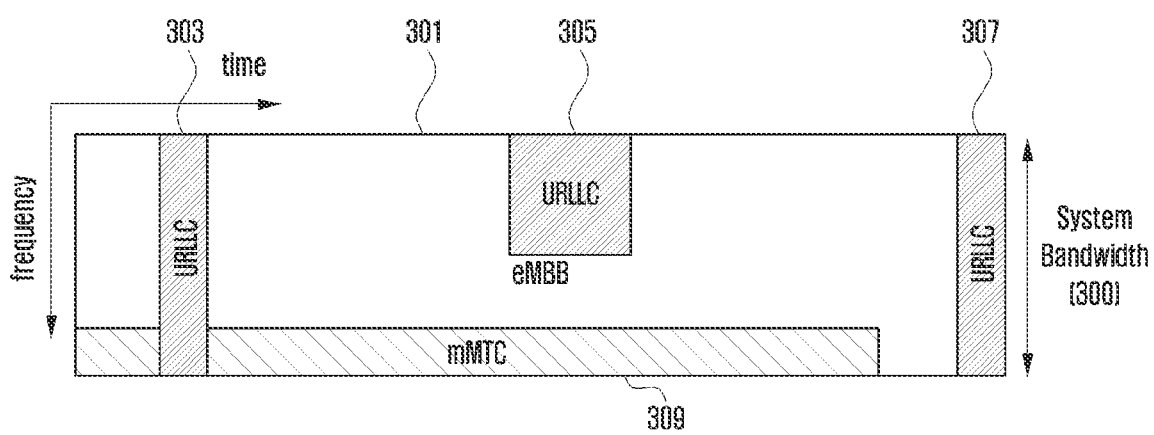
FIG. 3 is a diagram illustrating frequency-time resources allocated for transmitting data of eMBB, URLLC, and mMTC services in a communication system.
Figure 4:
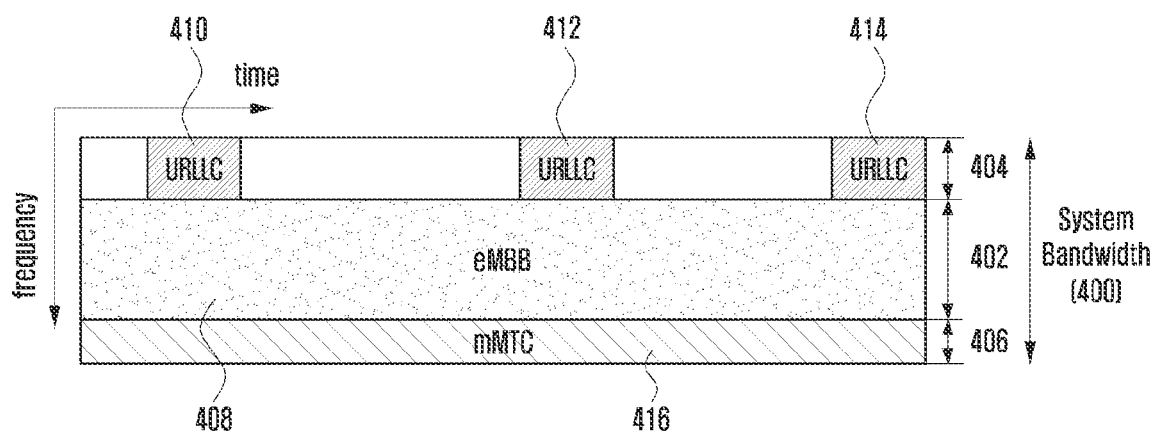
FIG. 4 is another diagram illustrating frequency-time resources allocated for transmitting data of eMBB, URLLC, and mMTC services in a communication system.

FIGS. 3 and 4 are diagrams illustrating frequency-time resources allocated for transmitting data of eMBB, URLLC, and mMTC services being considered in the 5G or NR system.

FIGS. 3 and 4 show how the frequency and time resources are allocated for information transmission in a system.

In FIG. 3, the eMBB, URLLC, and mMTC data are allocated across the entire system frequency band 300. If the URLLC data 303, 305, and 307 are generated to be transmitted during the transmission of the eMBB data 301 and mMTC data 309 in specific frequency bands, parts of the eMBB data 301 and mMTC data 309 may be punctured such that the URLLC data 303, 305, and 307 are inserted. Because the URLLC services are delay-sensitive among the aforementioned services, the URLLC data 303, 305, and 307 may occupy parts of the resources allocated for eMBB data 301. In the case of transmitting the URLLC data on the resources allocated for the eMBB data, the eMBB data may not be transmitted on the overlapping frequency-time resources, which may degrade eMBB data transmission throughput. That is, in the above case, the resource allocation for the URLLC data transmission may cause eMBB data transmission failure.

In FIG. 4, the system frequency band 400 is divided into sub-bands 402, 404, and 406 for data transmissions of different services. The sub-band configuration information may be preconfigured and transmitted from a base station to a terminal. It may also be possible for base stations or network nodes to share the sub-band to provide corresponding services without separately transmitting the sub-band configuration information to the terminal. In FIG. 4, the sub-bands 402, 404, and 406 are allocated for eMBB data transmission, URLLC data transmission, and mMTC data transmission, respectively.

Throughout the embodiment, the transmission time interval (TTI) for URLLC transmission may be shorter that the TTI for eMBB or mMTC transmission. The acknowledgement corresponding to the URLLC data may be transmitted more quickly than the acknowledgement corresponding to the eMBB or mMTC data, resulting in low latency information transmission/reception.

Figure 5:
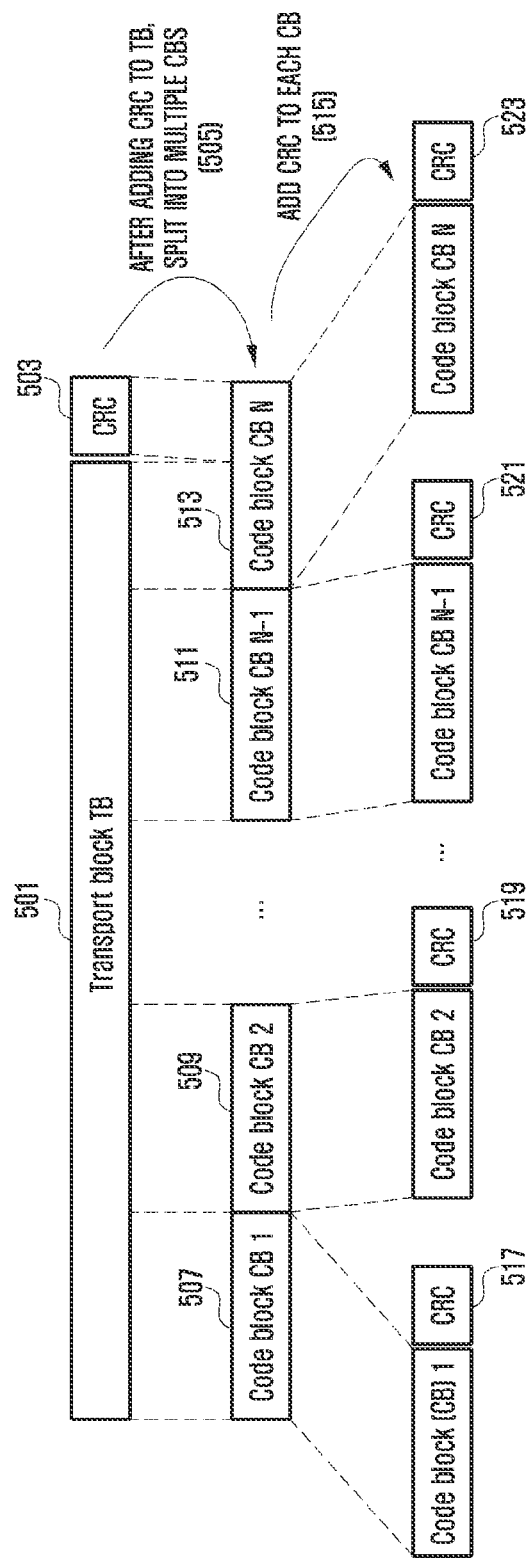
FIG. 5 is a diagram illustrating a procedure for splitting a transport block into multiple code blocks and adding a CRC to the code blocks.

FIG. 5 is a diagram illustrating a procedure for splitting a transport block into multiple code blocks and adding a CRC to the code blocks.

In reference to FIG. 5, a CRC 503 may be added at the beginning or end of a transport block (TB) 501 to be transmitted in uplink or downlink. The CRC may have a fixed length of 16 bits or 24 bits or a variable length varying with channel condition and may be used for determining whether the channel coding is successful. A block including the TB 501 and the CRC 503 may be split into multiple code blocks (CBs) 507, 509, 511, and 513 as denoted by reference number 505. Each CB has a predetermined maximum size as far as possible and, in this case, the last CB 513 may be smaller in size than the other code blocks; it may be possible to add 0s, random values, or 1s to the last CB to make the last CB to be equal in length to other CBs. It may be possible to add CRCs 517, 519, 521, and 523 to the respective CBs. The CRC may have a fixed length of 16 bits, 24 bits, or the like and may be used for determining whether the channel coding is successful. However, adding the CRC 503 to the TB and adding the CRCs 517, 519, 521, and 523 to the respective CBs may be omitted depending on the type of the channel code to be applied to the CBs. For example, in the case of applying an LDPC code rather than a turbo code, adding the CRCs 517, 519, 521, and 523 to the respective CBs may be omitted. However, even if the LDPC code is applied, the CRCs 517, 519, 521, and 523 may be added to the CBs. Even in the case of using a polar code, it may be possible to add CRCs to the CBs or omit adding the CRCs to the CBs.

In the following description, an eMBB service is referred to as a first type service, and eMBB service data are referred to as first type data. The terms "first type service" and "first type data" are not limited to eMBB, and they may include other service types requiring a high speed data transmission or broadband transmission. Meanwhile, a URLLC service is referred to as a second type service, and URLLC service data are referred to as second type data. The terms "second type service" and "second type data" are not limited to URLLC, and they may include other service types requiring low latency, high reliability transmission, or low latency and high reliability transmission. Meanwhile, an mMTC service is referred to as a third type service, and mMTC service data are referred to as third type data. The terms "third type service" and "third type data" are not limited to mMTC, and they may include other service types requiring low speed, broad coverage, or low power transmission. In an embodiment, the first type service may be understood as including or not including the third type service.

The physical layer channel structures for transmitting the three types of services or data may differ from each other. For example, they may differ in at least one of TTI length, frequency resource allocation unit, control channel structure, and data mapping scheme.

Although three types of services and three types of data are enumerated above, the principle of the present invention can be applied to the cases were a larger number of service and data types exist.

In an embodiment, the terms "physical channel" and "signal" in use for LTE and LTE-A systems are used for explaining the proposed method and device. However, the principle of the present invention is applicable to other wireless communication systems as well as the LTE and LTE-A systems.

As described above, the present invention defines communication operations between a terminal and a base station for transmitting the first, second, and third type services or data and proposes a method for serving the terminals in such a way of scheduling the different types of services or data for the respective terminals in the same system. In the present invention, the terms "first type terminal", "second type terminal", and "third type terminal" are intended to indicate the terminals for which the first, second, and third types of services or data, respectively, are scheduled. In an embodiment, the first type terminal, second type terminal, and third type terminal may be identical with or different from each other.

In the following description, at least one of a PHICH, an uplink scheduling grant signal, and a downlink data signal is referred to as first signal. In the present invention, an uplink data signal scheduled by the uplink scheduling grant and the HARQ ACK/NACK corresponding to a downlink data signal are referred to as second signal. In the following description, if one of the signals being transmitted from the base station to the UE requires a response thereto, it may be the first signal, and the response of the UE to the first signal may be the second signal. In the following description, the service type of the first signal may fall in three categories: eMBB, mMTC, and URLLC; the second signal may be a signal corresponding to one of the service categories. For example, in the LTE and LTE-A system, a PUCCH format 0 or 4 and a PHICH may be regarded as the first signal, and a PUSCH being transmitted in response thereto may be regarded as the second signal. In the LTE and LTE-A systems, a PDSCH may be regarded as the first signal, and a PUCCH or PUSCH carrying HARQ ACK/NACK corresponding to the PDSCH may be regarded as the second signal. A PDCCH/EPDCCH carrying an aperiodic CSI trigger may be regarded as the first signal, and a PUSCH carrying the channel measurement information being transmitted in response thereto may be regarded as the second signal.

In the following description, assuming that a terminal transmits the second signal at the $(n+k)^{th}$ TTI after receiving the first signal transmitted by a base station at the $n^{th}$ TTI, if the base station notifies the terminal of a second signal transmission timing, this means that the base station sends the terminal a value of k. Assuming that the terminal transmits the second signal at $(k+4+a)^{th}$ TTI after receiving the first signal transmitted by the base station at the $n^{th}$ TTI, if the base station notifies the terminal of the second signal transmission timing, this means that the base station sends the terminal an offset value of a. The offset value may be defined in various forms such as n+3+a and n+5+a instead of n+4+k and, in the present invention, the offset value may also be defined in various ways.

Although the description is directed to the FDD LTE system, the principle of the present invention is applicable to the TDD system and NR systems.

In the present invention, the term "higher layer signaling" denotes a signaling method for the base station to transmit a signal to the UE on a downlink data channel of the physical layer or for the UE to transmit a signal to the base station on an uplink data channel of the physical layer and may be referred to as RRC signaling or MAC control element (CE) signaling.

Although the description is directed to the method for a terminal or a base station to determine a second signal transmission timing after receiving a first signal, the second signal may be transmitted in various manners. For example, it may be possible to select a PUCCH format and PUCCH resources and map HARQ ACK/NACK information to PUSCH in compliance with the legacy LTE standard while determining the timing for the terminal to transmit HARQ ACK/NACK information corresponding to a PDSCH as downlink data to the base station in compliance with a proposed method of the present invention.

In the present invention, the term "normal mode" denotes a mode for using the first and second signal transmission timings in use for the legacy LTE and LTE-A systems and the normal mode makes it possible to secure the signal processing time of about 3 ms including a TA. For example, in an FDD LTE system operating in the normal mode, a UE transmits the second signal at subframe n+4 after receiving the first signal at subframe n. In the present invention, such a transmission is referred to as the n+4 timing transmission. If the second signal corresponding to the first signal transmitted at subframe n+k is scheduled to be transmitted at n+4 timing, this means that the second signal is transmitted at subframe n+k+4. Meanwhile, the n+4 timing in TDD may mean complying with the timing relationship pre-agreed under the assumption that the earliest subframe at which the second signal corresponding to the first signal transmitted at subframe n can be transmitted is subframe n+4. In the TDD system, subframe n+4 may not be an uplink subframe and, in this case, the terminal cannot transmit the second signal at subframe n+4. Accordingly, there is a need of defining a timing relationship for transmitting the second signal; if the timing relationship is defined under the assumption that the earliest timing is subframe n+4, this may be called n+4 timing. Meanwhile, if an n+3 timing transmission is used in a TDD system, this may mean complying with a timing relationship pre-agreed under the assumption that the earliest subframe at which the second signal corresponding to the first signal transmitted at subframe n can be transmitted is subframe n+3. Likewise, there is a need of defining a timing relationship for transmitting the second signal; if the timing relationship is defined under the assumption that the earliest timing is subframe n+3, this may be called n+3 timing.

In the present invention, the term "latency reduction mode" denotes a mode for making the transmission timing of the second signal corresponding to the first signal to be earlier than or equal to that in the normal mode to reduce latency. In the latency reduction mode, it may be possible to control the timing in various manners. In the present invention, the term "latency reduction mode" may be interchangeably referred to as reduced processing time mode. The latency reduction mode may be configured to a terminal supporting the latency reduction mode via higher layer signaling. The terminal configured in the latency reduction mode may transmit the second signal at a subframe earlier than subframe n+4 after the receipt of the first signal at subframe n. For example, the terminal configured in the latency reduction mode may transmit the second signal at subframe n+3 after the receipt of the first signal transmitted at subframe n. In the present invention, such a transmission is referred to as n+3 timing transmission. If the second signal corresponding to the first signal transmitted at subframe n+1 is scheduled to be transmitted at n+3 timing, this means that the second signal is transmitted at subframe n+4. By way of another example, if the second signal corresponding to the first signal transmitted at subframe n+2 is scheduled to be transmitted at subframe n+3, this means that the second signal is transmitted at subframe n+5. That is, if the second signal corresponding to the first signal transmitted at subframe n+k is scheduled to be transmitted at n+3 timing, this means that the second signal is transmitted at subframe n+k+3.

In the present invention, the description is directed to the case where the normal and latency reduction modes are equal in TTI length. However, the principle of the present invention is also applicable to the cases whether the normal and latency reduction modes differ in TTI length.

In embodiments of the present invention, if the first signal is a PDSCH, the second signal may be a PUCCH or PUSCH carrying the HARQ ACK corresponding to the PDSCH. If the first signal is a PHICH or a PDCCH/EPDCCH carrying uplink scheduling information, the second signal may be a PUSCH scheduled by the uplink scheduling information. If the first signal is a PDCCH/EPDCCH carrying an aperiodic CSI trigger, the second signal may be a PUSCH carrying channel measurement information.

Because it is uncertain when the higher layer signal is transmitted by the base station to configure the terminal in the latency reduction mode, there is a need of a method for the terminal to transmit the second signal to the base station at a predetermined timing regardless of the configuration. For example, although the base station configures the terminal in the latency reduction mode to comply with the n+3 timing transmission, the terminal cannot be aware of the timing when the latency reduction mode configuration becomes valid. Accordingly, there is a need of a method for allowing the terminal to perform a transmission in compliance with the n+4 timing transmission. That is, there may be a need of a method for performing the n+4 timing transmission regardless of the latency reduction mode configuration. In the present invention, a method for performing the n+4 timing transmission regardless of the latency reduction mode configuration is referred to as fallback mode transmission. If the fallback mode transmission is enabled, the base station performs an uplink reception operation under the assumption that the second signal is transmitted at n+4 timing rather than n+3 and n+2 timing.

The fallback mode transmission may be performed by at least one of 1) the first signal is transmitted in a predetermined DCI format, 2) DCI for transmitting the first signal transmission is transmitted in a predetermined search space, and 3) DCI by using a predetermined RNTI value is transmitted.

The predetermined search space may be one of a cell-specific search space (CSS) and a UE-specific search space (USS), which are defined as follows. An index of a control channel element (CCE) to which the downlink control signal and control channel of aggregation level L in subframe k may be calculated as follows.

$$J\{(Y_k+m') \bmod \lfloor N_{CCE,k}/L \rfloor\}+i$$

In a CSS, Yk is defined as 0 for aggregation levels 4 and 8. In a USS, $Y_k=(AY_{k-1}) \bmod D$, $Y_{-1}=n_{RNTI}$ (not 0), A=39827, D=65537, and $k=\lfloor n/2 \rfloor$, and denotes a slot index in a radio frame. Here, x mod y may denote a remainder obtained by dividing x by y. Here, $M^{(L)}$ denotes a number of downlink control channels at aggregation level L. Here, m is a natural value in the range from 0 to $M^{(L)}$ (m'=m in CSS and $m'=m+M^{(L)}n_{CI}$ in USS), and $n_{CI}$ may be a carrier indicator field value. The value of $M^{(L)}$ may be defined as shown in Table 5.

TABLE 5

| Type | Search space $S_k^L$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In the CSS, the CCE index from which a control signal mapping starts is determined as 0, 4, 8, or 12 at aggregation level 4 and as 0 or 8 at aggregation level 8. In the USS, it may vary with an RNTI value as an identifier of the terminal.

In the case of using method 1) for the fallback mode transmission in which the first signal is transmitted in a predetermined DCI format, when a downlink scheduling is made with DCI format 1A in the legacy LTE system by way of example, the second signal may always be transmitted at the n+k timing regardless of the latency reduction mode configuration of the base station. That is, although the terminal is configured to transmit the second signal at n+3 timing, if the downlink scheduling is made with DCI format 1A, the terminal transmits the second signal at n+4 timing.

In the case of using method 2) for the fallback mode transmission in which DCI for transmitting the first signal transmission is transmitted in a predetermined search space, when the DCI is transmitted in a region configured as a cell common search space, the second signal corresponding to the first signal associated with the DCI may always be transmitted at n+4 timing regardless of the latency reduction mode configuration of the base station. That is, although the terminal is configured to transmit the second signal at n+3 timing, if the DCI is received in the cell common search space, the terminal transmits the second signal at n+4 timing.

In the case of using method 3) for the fallback mode transmission in which DCI is transmitted with a predetermined RNTI value, when the base station configures an RNTI for use in the fallback mode transmission to the terminal and transmits PDCCH/EPDCCH carrying the DCI to the RNTI, the second signal corresponding to the first signal associated with the DCI may always be transmitted at n+4 timing regardless of the latency reduction mode configuration of the base station. That is, although the terminal is configured to transmit the second signal at n+3 timing, if the PDCCH/EPDCCH is successfully decoded with the RNTI, the terminal transmits the second signal at n+4 timing.

Figure 6:
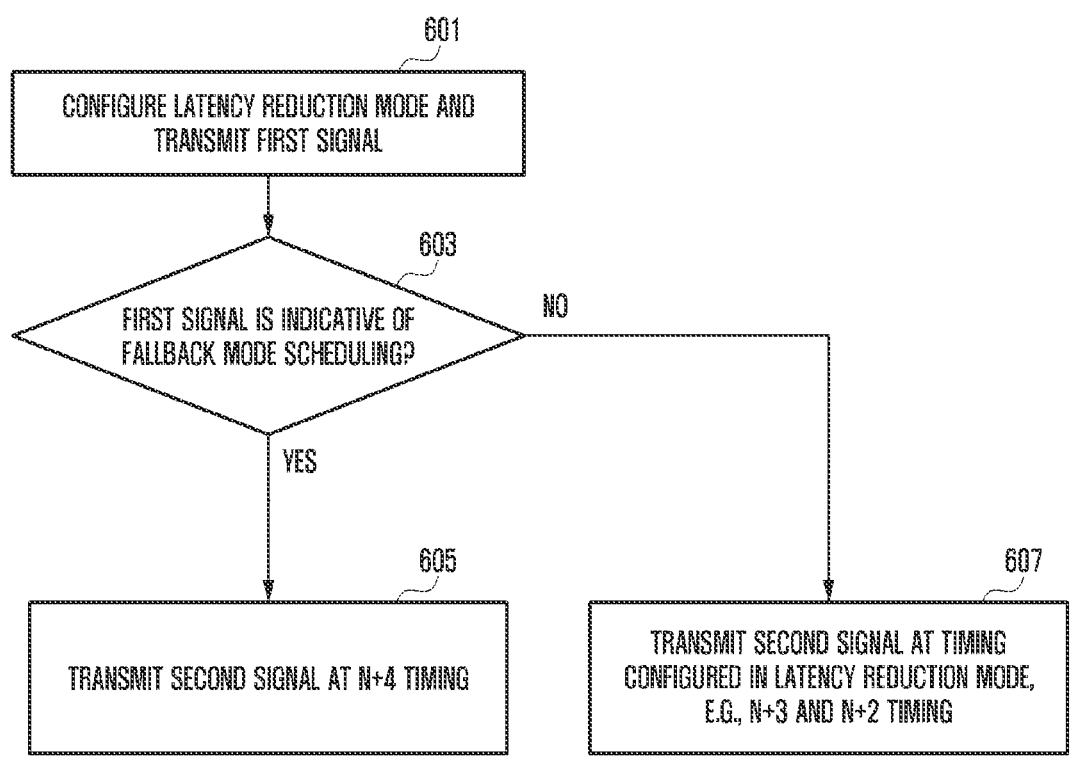
FIG. 6 is a flowchart illustrating an uplink transmission method of a terminal.

FIG. 6 is a flowchart illustrating an uplink transmission method of a terminal when a base station configures a latency reduction mode to the terminal and transmits a first signal at step 601. When the first signal is received from the base station at step 601, the terminal check the first signal to determine at step 603 whether the first signal is indicative of a fallback mode transmission; if it is determined at step 603 that the first signal is indicative of the fallback mode transmission, the terminal transmits a second signal at n+4 timing at step 605 regardless of a latency reduction mode configuration. If it is determined at step 603 that the first signal is not indicative of the fallback mode transmission, the terminal transmits, at step 607, the second signal at a timing determined according to the latency reduction mode configuration, e.g., n+3 or n+2 timing.

In an embodiment of the present invention, different approaches to the invention may be discerned with distinguishing numerals such as 1), 2), and 3).

In the present invention, there are two transmission modes: normal mode in which the earliest transmission timing of the second signal corresponding to the first signal transmitted at subframe n is subframe n+4 and latency reduction mode or signal processing time reduction mode in which the earliest transmission timing of the second signal corresponding to the first signal transmitted at subframe n is subframe n+2 or n+3. The subframe n+4 as a transmission timing for discerning between the normal mode and the latency reduction mode may be changed to an alternative timing in the present invention.

In the present invention, the description is directed to a method of operating in fallback mode with the n+4 timing in the case where a DCI is detected in a predetermined search space. That is, in the case of enabling the fallback mode transmission when DCI scheduling a first signal transmission is transmitted in a predetermined search space, if the DCI is received in a region configured as a common search space (CSS), the second signal corresponding to the first signal associated with the DCI may always be transmitted at n+4 timing regardless of the latency reduction mode configuration of the base station. In this case, although the terminal is configured to transmit the second signal at n+3 timing, if the DCI is received in the CSS, the terminal transmits the second signal at n+4 timing. However, if the DCI is received in a UE-specific search space (USS), the terminal transmits the second signal at n+3 timing as configured.

A legacy LTE terminal attempts to decode a DCI format that varies according to the transmission mode. For example, the terminal configured in transmission mode 4 may attempt to detect DCI format 1A in CSSs and USSs for receiving PDSCH transmitted to a C-RNTI and to detect DCI format 2 in the USSs. Accordingly, in the above example, if the latency reduction mode to n+3 timing is configured, the fallback mode to the n+4 timing is triggered when the terminal detects the DCI format 1A in a CSS. The present invention aims to provide operation methods of the terminal and the base station when the search space in which the terminal attempts to detect the DCI format 1A is a CSS and, simultaneously, a USS. That is, the problem arises when a CSS and a USS are overlapped. For example, if the aggregation level is 4 or 8, the search spaces each composed of 4 or 8 CCEs may be included in both the CSSs and USSs. If a certain search space is a CSS and, simultaneously, a USS for the terminal configured in the latency reduction mode to the n+3 timing and if the terminal detects the DCI format 1A in the search space, the terminal may not determine whether the timing for transmitting the HARQ ACK feedback corresponding to the downlink data scheduled with the detected DCI format 1A is the n+3 timing or the n+4 timing. The present invention proposes operation methods of the terminal and the base station to solve this problem. In the present invention, the term "first search space" may be interchangeably referred to as cell-specific search space (CSS), and the term "second search space" may be interchangeably referred to as UE-specific search space (USS). In the present invention, the terms "detection" and "decoding" may be interchangeably used with the same meaning.

In the present invention, the fallback mode may be enabled when the base station configures the latency reduction mode to the terminal, but it is not used in the normal mode. In the present invention, the second signal corresponding to a downlink control signal may be an HARQ ACK corresponding to downlink data scheduled by the control signal or uplink data scheduled by an uplink grant conveyed in the control signal.

Embodiment 1

Embodiment 1 is directed to a method for prioritizing a first search space over a second search space when a terminal decodes a downlink control signal successfully in a search space that is simultaneously the first search space and the second search space, and the method is described with reference to FIGS. 7 and 8.

When the base station has configured the terminal in the latency reduction mode to transmit the second signal at n+3 timing, the terminal may enable a fallback mode in order to transmit the second signal at n+4 timing for the case where the downlink control signal is decoded in the first search space and at n+3 timing for the case where the downlink control signal is decoded in the second search space. However, if the search space in which the downlink control signal is decoded is the first search space and, simultaneously, the second search space, the terminal may regard the search space as the first search space. That is, when a search space is the first search space and, simultaneously, the second search space, the terminal may regard the search space as the first search space. Accordingly, if the search space in which the downlink control signal is decoded is the first search space and, simultaneously, the second search space, the terminal transmits a corresponding second signal to the base station at n+4 timing. In other words, the terminal transmits the corresponding second signal to the base station at n+4 timing for the case where the downlink control signal is decoded in the first search space and at n+3 timing for the case where the downlink control signal is decoded in a search space that is not the first search space. That is, if the downlink control signal is decoded in the first search space, the terminal enables the fallback mode for transmitting the second signal at n+4 timing. This method is applicable in association with a control signal format that can be transmitted in both the first and second search spaces, and a different method may be used in association with a specific control signal that can be transmitted only in the second search space. If the terminal detects the control signal that can be transmitted only in the second search space in a search space that is simultaneously the first search space and the second search space, it may regard the corresponding search space as the second search space. For example, the method according to embodiment 1 may be used for detecting the DCI format 1A, and the DCI being transmitted only in the USS such as DCI format 2 may always be detected in the second search space. In an FDD system, if the terminal detects the DCI format 1A in a CSS, it transmits the second signal at n+4 timing. In a TDD system, if the terminal detects the DCI format 1A in a CSS, it transmits the second signal by using a timing defined by assuming that the earliest timing is n+4 timing.

Figure 7:
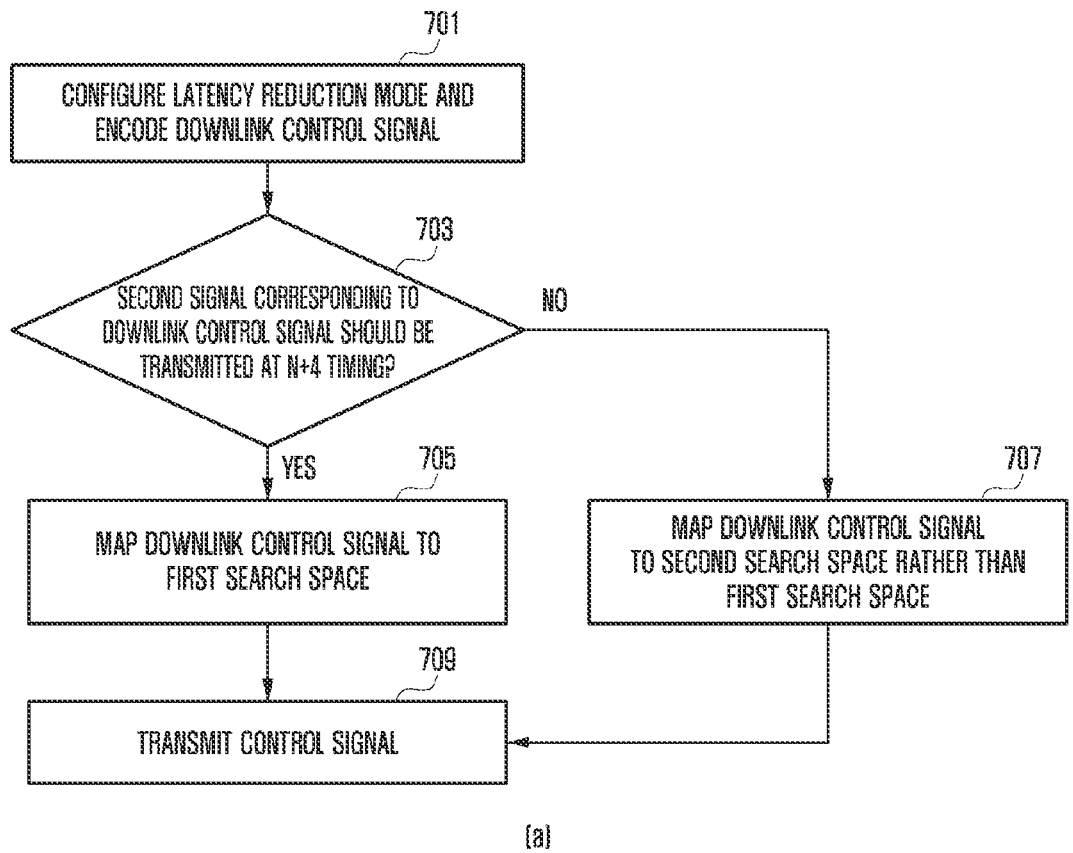
FIG. 7 shows flowcharts illustrating operation methods of a base station according to embodiment 1.
Figure 7:
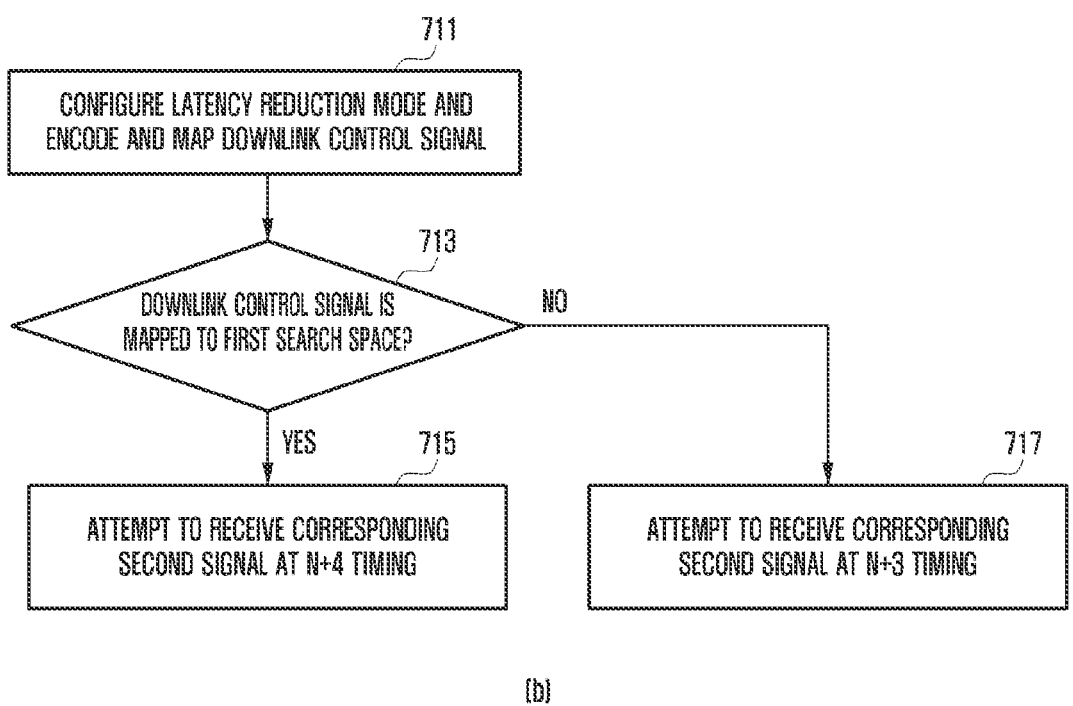

FIG. 7 shows flowcharts illustrating operation methods of a base station according to embodiment 1. Part (a) of FIG. 7 is a flowchart illustrating a method for a base station to map a control signal to a search space. At step 701, the base station configures the terminal in the latency reduction mode and encodes a downlink control signal to be transmitted. At step 703, the base station determines at step 703 whether the terminal has to transmit the second signal corresponding to the control signal and the first signal at n+4 timing or n+3 timing. If it is determined that the terminal has to transmit the second signal at n+4 timing, the base station maps the downlink control signal to the first search space at step 705. If it is determined that the terminal has to transmit the second signal at n+3 timing, the base station maps the downlink control signal to the second search space rather than the first search space at step 707. Afterward, the base station transmits the mapped control signal through a control channel at step 709.

Part (b) of FIG. 7 is a flowchart illustrating a method for a base station to determine a timing for receiving the second signal corresponding to the control signal depending on the search space to which the control signal is mapped. At step 711, the base station configures the terminal in the latency reduction mode, encodes the downlink control signal, and maps the control signal to a search space. The base station determines at step 713 whether the control signal is mapped to the first search space. If it is determined that the control signal is mapped to the first search space, the base station receives the second signal corresponding to the first signal at n+4 timing at step 715. If it is determined that the control signal is not mapped to the first search space, the base station receives the second signal corresponding to the first signal at n+3 timing at step 717.

Figure 8:
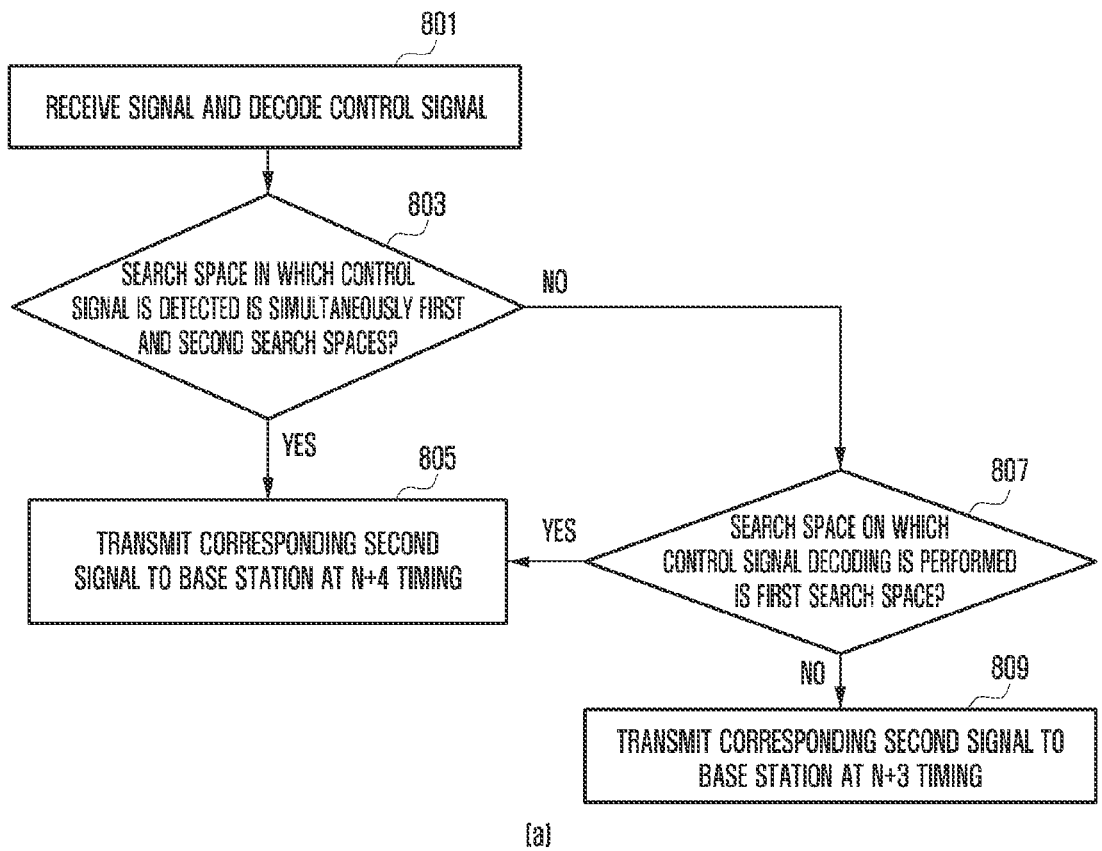
FIG. 8 shows flowcharts illustrating operation methods of a terminal according to embodiment 1.
Figure 8:
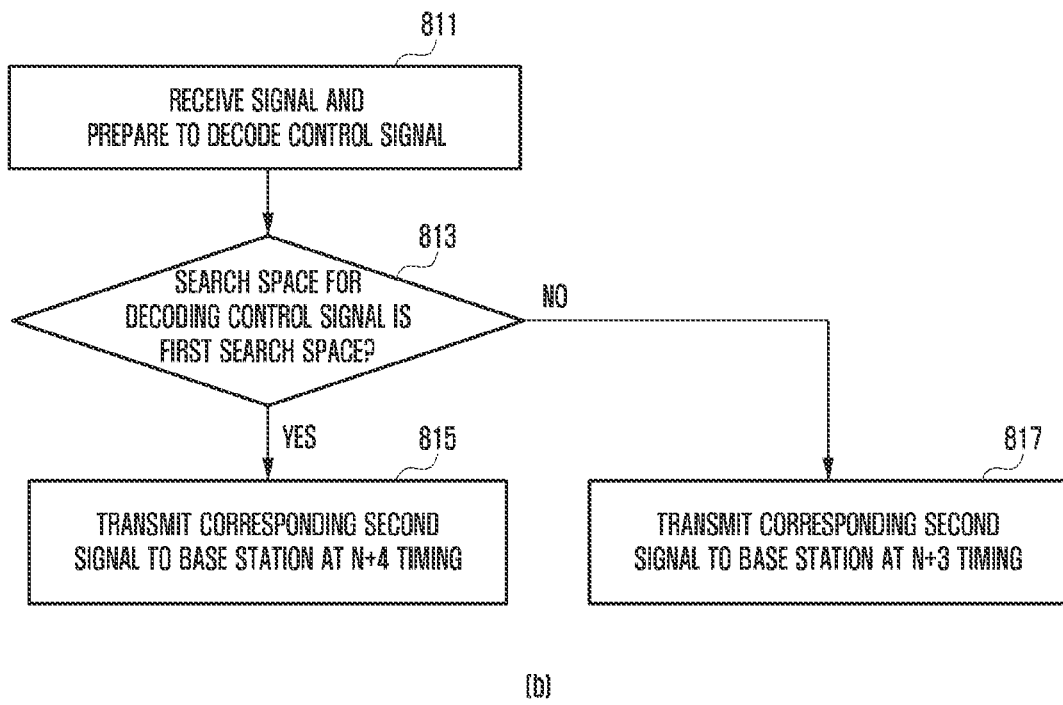

FIG. 8 shows flowcharts illustrating operation methods of a terminal according to embodiment 1. Part (a) of FIG. 8 is a flowchart illustrating a method for a terminal to determine a timing for transmitting the second signal depending on the search space in which a control signal is detected. At step 801, the terminal configured in the latency reduction mode receives a signal and performs control signal decoding. The terminal determines at step 803 whether the search space in which the control signal is detected is the first search space and, simultaneously, the second search space. If it is determined that the search space in which the control signal is detected is the first search space and, simultaneously, the second search space, the terminal transmits, at step 805, the second signal corresponding to the first signal to the base station at n+4 timing. If it is determined that the search space in which the control signal is detected is not the first search space and, simultaneously, the second search space, the terminal determines at step 807 whether the search space is the first search space; if so, the terminal transmits, at step 805, the second signal corresponding to the first signal to the base station at n+4 timing. If it is determined that the search space in which the control signal is detected is not the first search space, the terminal transmits, at step 809, the second signal corresponding to the first signal to the base station at n+3 timing.

Part (b) of FIG. 8 is a flowchart illustrating another method for a terminal to determine a timing for transmitting the second signal depending on the search space in which the control signal is detected. At step 811, the terminal configured in the latency reduction mode receives a signal and performs control signal decoding. The terminal determines at step 813 whether the search space in which the control signal is detected is the first search space and, if so, transmits, at step 815, the second signal corresponding to the first signal to the base station at n+4 timing. If it is determined that the search space in which the control signal is detected is not the first search space, the terminal transmits, at step 817, the second signal corresponding to the first signal to the base station at n+3 timing.

Considering that a specific DCI format such as DCI format 1A that can be transmitted in both the first and second search spaces is used when the channel condition of a normal terminal is degraded or during higher layer signaling, the base station and the terminal may be designed to operate as described in this embodiment under the assumption that the DCI formats such as DCI format 1A are used for special case.

Embodiment 2

Embodiment 2 is directed to a method for prioritizing a second search space of a first search space when a terminal decodes a downlink control signal successfully in a search space that is simultaneously the first search space and the second search space, and the method is described with reference to FIGS. 9 and 10.

When the base station has configured the terminal in the latency reduction mode to transmit the second signal at n+3 timing, the terminal may enable a fallback mode in order to transmit the second signal at n+4 timing for the case where the downlink control signal is decoded in the first search space and at n+3 timing for the case where the downlink control signal is decoded in the second search space. However, if the search space in which the downlink control signal is decoded is the first search space and, simultaneously, the second search space, the terminal may regard the search space as the second search space. That is, when a search space is the first search space and, simultaneously, the second search space, the terminal may regard the search space as the second search space. Accordingly, if the search space in which the downlink control signal is decoded is the first search space and, simultaneously, the second search space, the terminal transmits a corresponding second signal to the base station at n+3 timing. In other words, the terminal transmits the corresponding second signal to the base station at n+3 timing for the case where the downlink control signal is decoded in the second search space and at n+4 timing for the case where the downlink control signal is decoded in a search space that is not the second search space. That is, if the downlink control signal is decoded in a search space that is not the second search space, the terminal enables the fallback mode for transmitting the second signal at n+4 timing. This method is applicable for a control signal format that can be transmitted in both the first and second search spaces, and a different method may be used for a specific control signal that can be transmitted only in the second search space. If the terminal detects the control signal that can be transmitted only in the second search space in a search space that is simultaneously the first search space and the second search space, it may regard the corresponding search space as the second search space. For example, the method according to embodiment 2 may be used for detecting the DCI format 1A, and the DCI being transmitted only in the USS such as DCI format 2 may always be detected in the second search space. In an FDD system, if the terminal detects the DCI format 1A in a search space that is not a USS, it transmits the second signal at n+4 timing. In the TDD system, if terminal detects DCI format 1A in a search space that is not a USS, it transmits the second signal by using a timing defined by assuming that the earliest timing is n+4 timing.

Figure 9:
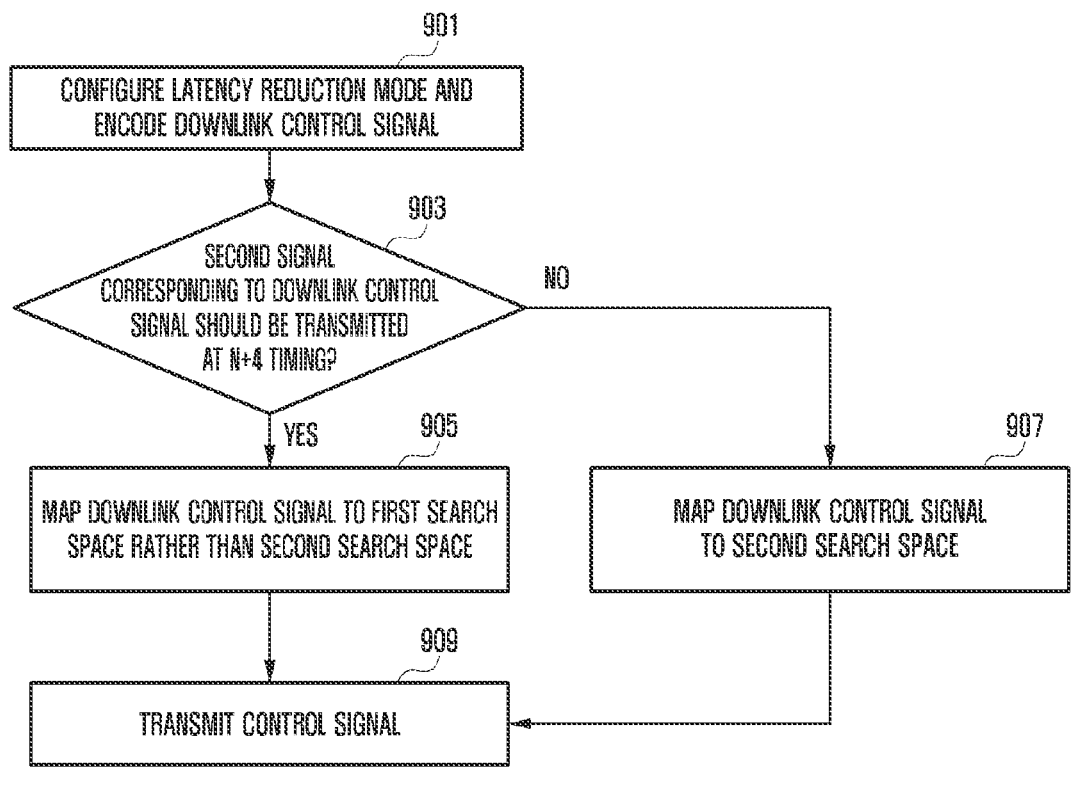
FIG. 9 shows flowcharts illustrating operation methods of a base station according to embodiment 2.
Figure 9:
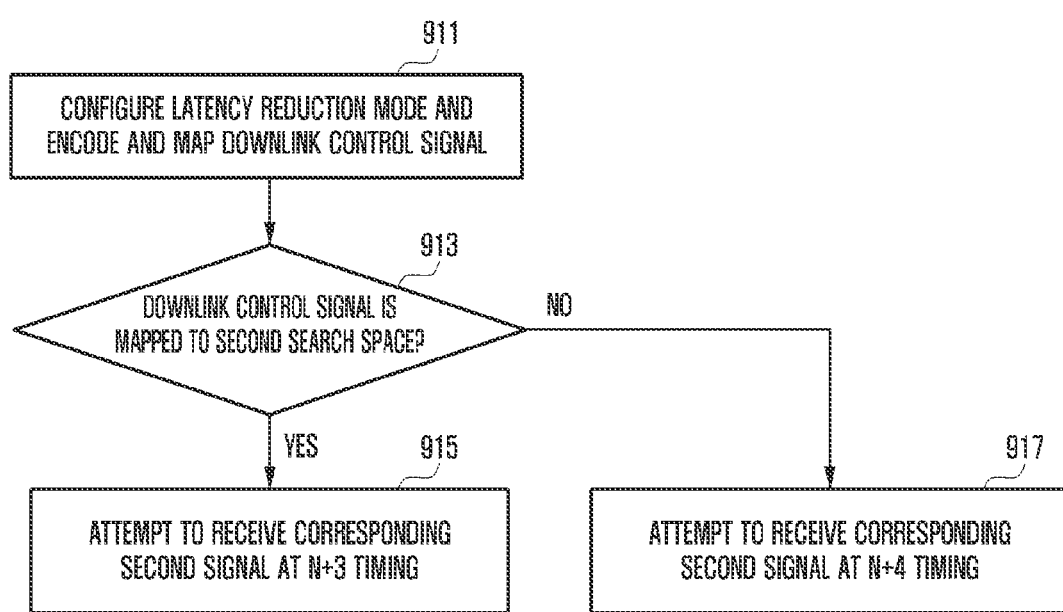

FIG. 9 shows flowcharts illustrating operation methods of a base station according to embodiment 2. Part (a) of FIG. 9 is a flowchart illustrating a method for a base station to map a control signal to a search space. At step 901, the base station configures the terminal in a latency reduction mode and encodes a downlink control signal to be transmitted. At step 903, the base station determines whether the terminal has to transmit a second signal corresponding to the control signal and a first signal at n+4 timing or n+3 timing. If it is determined that the terminal has to transmit the second signal at n+4 timing, the base station maps the downlink control signal to the first search space rather than the second search space at step 905. If it is determined that the terminal has to transmit the second signal at n+3 timing, the base station maps the downlink control signal to the second search space at step 907. Afterward, the base station transmits the mapped control signal through a control channel at step 909.

Part (b) of FIG. 9 is a flowchart illustrating a method for abase station to determine a timing for receiving the second signal corresponding to the control signal depending on the search space to which the control signal is mapped. At step 911, the base station configures the terminal in the latency reduction mode, encodes the downlink control signal, and maps the control signal to a search space. The base station determines at step 913 whether the control signal is mapped to the second search space. If it is determined that the control signal is mapped to the second search space, the base station receives the second signal corresponding to the first signal at n+3 timing at step 915. If it is determined that the control signal is not mapped to the second search space, the base station receives the second signal corresponding to the first signal at n+4 timing at step 917.

Figure 10:
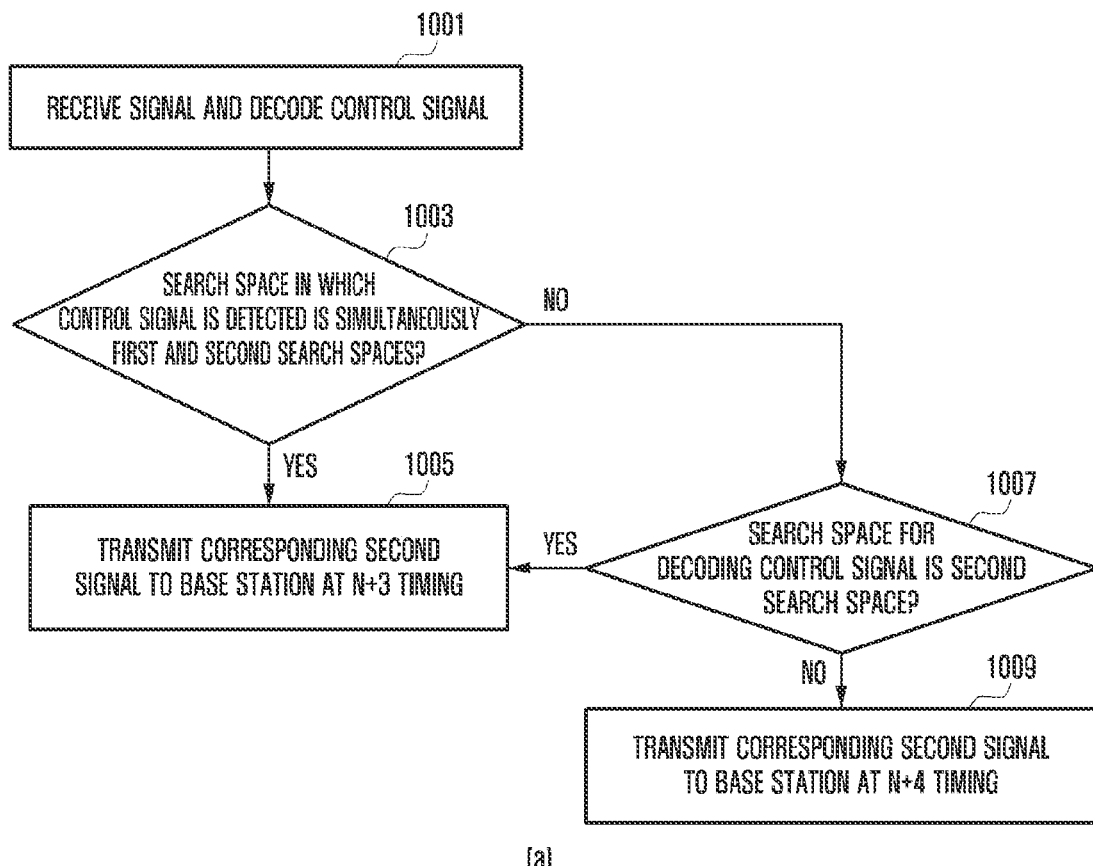
FIG. 10 shows flowcharts illustrating operation methods of a terminal according to embodiment 2.
Figure 10:
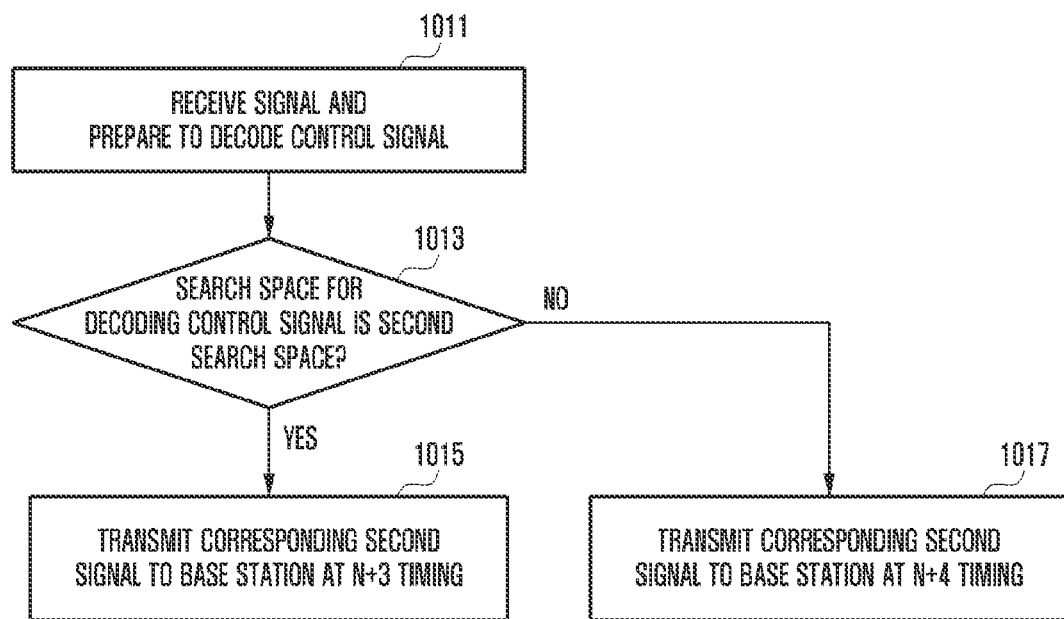

FIG. 10 shows flowcharts illustrating operation methods of a terminal according to embodiment 2. Part (a) of FIG. 10 is a flowchart illustrating a method for a terminal to determine a timing for transmitting the second signal depending on the search space in which a control signal is detected. At step 1001, the terminal configured in the latency reduction mode receives a signal and performs control signal decoding. The terminal determines at step 1003 whether the search space in which the control signal is detected is a search space that is simultaneously the first search space and the second search space. If it is determined that the search space in which the control signal is detected is not a search space that is simultaneously the first search space and the second search space, the terminal transmits, at step 1005, the second signal corresponding to the first signal to the base station at n+3 timing. If it is determined that the search space in which the control signal is detected is not the first search space and, simultaneously, the second search space, the terminal determines at step 1007 whether the search space is the first search space; if so, the terminal transmits, at step 1005, the second signal corresponding to the first signal to the base station at n+3 timing. If it is determined that the search space in which the control signal is detected is not the first search space, the terminal transmits, at step 1009, the second signal corresponding to the first signal to the base station at n+4 timing.

Part (b) of FIG. 10 is a flowchart illustrating another method for a terminal to determine a timing for transmitting the second signal depending on the search space in which the control signal is detected. At step 1011, the terminal configured in the latency reduction mode receives a signal and performs control signal decoding. The terminal determines at step 1013 whether the search space in which the control signal is detected is the second search space and, if so, transmits, at step 1015, the second signal corresponding to the first signal to the base station at n+3 timing. If it is determined that the search space in which the control signal is detected is not the second search space, the terminal transmits, at step 1017, the second signal corresponding to the first signal to the base station at n+4 timing.

Because it is assumed that the base station and the terminal have pre-agreed to use the n+3 timing transmission via higher layer signaling in this embodiment, the base station and the terminal prioritizes the n+3 timing transmission over the n+4 timing transmission.

Embodiment 3

Figure 11:
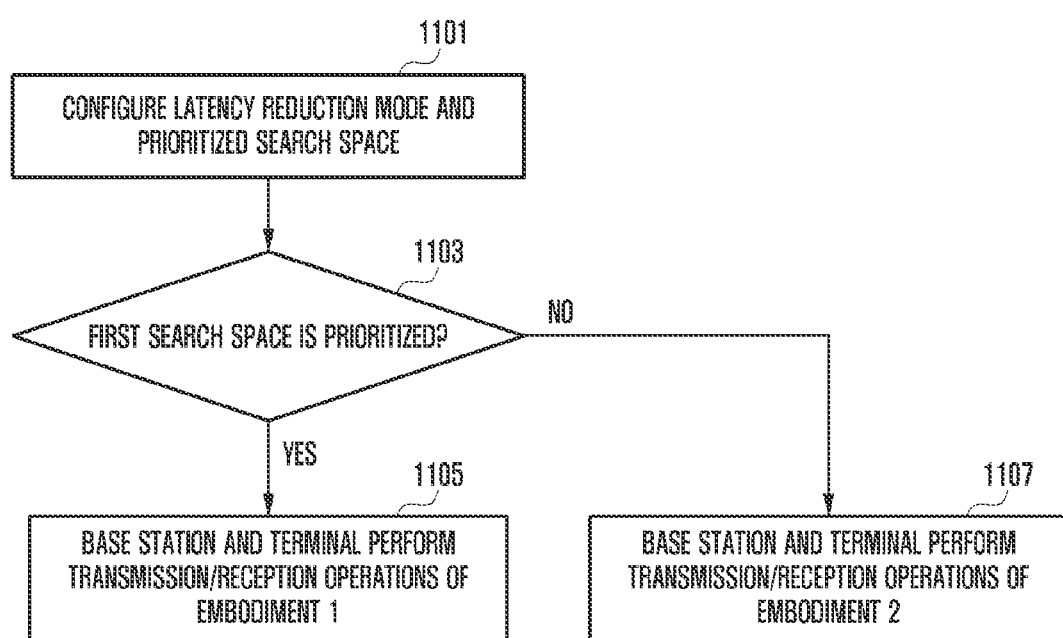
FIG. 11 is a flowchart illustrating operations of a base station and a terminal according to embodiment 3.

Embodiment 3 is directed to a method for configuring a terminal to prioritize, when a terminal decodes a downlink control signal successfully in a search space that is simultaneously the first search space and the second search space, one of search space spaces over the other, and the method is described with reference to FIG. 11.

At step 1101, the base station configures the terminal with the latency reduction mode and a prioritized search space via higher layer signaling. For example, if a search space is simultaneously the first search space and the second search space, the base station may transmit, via higher layer signaling, configuration information including a variable, i.e., prioritized_common_search_space, for use by the terminal in determining whether to regard the search space as the first search space or the second search space. In this embodiment, the terminal regards the search space as the first search space, which leads the procedure to step 1105, for the case where the variable, i.e., prioritized_common_search_space, is set to a value of TRUE and regards the search space as the second search space, which leads the procedure to step 1107, for the case where the variable is set to a value of FALSE.

In the case where a search space is simultaneously the first search space and the second search space, if the terminal regards the search space as the first search space, the base station and the terminal perform transmission/reception operations as described in embodiment 1 at step 1105.

In the case where a search space is simultaneously the first search space and the second search space, if the terminal regards the search space as the second search space, the base station and the terminal perform transmission/reception operations as described in embodiment 2 at step 1107.

This method is applicable in association with a control signal format that can be transmitted in both the first and second search spaces, and a different method may be used in association with a specific control signal that can be transmitted only in the second search space. If the terminal detects the control signal that can be transmitted only in the second search space in a search space that is simultaneously the first search space and the second search space, it may regard the corresponding search space as the second search space. For example, the method according to embodiment 3 may be used for detecting the DCI format 1A, and the DCI being transmitted only in the USS such as DCI format 2 may always be detected in the second search space.

Embodiment 4

Embodiment 4 is directed to a method for using, when a terminal decodes a downlink control signal successfully in a search space that is simultaneously the first search space and the second search space, a transmission timing that has been used for the previous downlink data transmission, and the method is described with reference to FIG. 12.

In the case where the base station configures the terminal in the latency reduction mode to transmit a second signal at n+3 timing, the terminal may transmit the second signal at n+4 timing for the case where the downlink control signal is decoded in the first search space and enable a fallback mode to transmit the second signal at n+3 timing for the case where the downlink control signal is decoded in the second search space. In the case where the search space in which the downlink control signal is decoded is simultaneously the first search space and the second search space, however, the terminal may transmit the second signal at the transmission timing used for transmitting the second signal corresponding to the previously received control signal. That is, if the currently received control signal is decoded in the search space that is simultaneously the first search space and the second search space, the terminal uses the transmission timing of the second signal that has been determined based on the control signal scheduled by the most recently received downlink data or most recently transmitted uplink data among the control signals received in the previous subframes. If the second signal corresponding to the most recently received control signal has been transmitted at n+3 timing, the terminal transmits the second signal corresponding to the currently received control signal at n+3 timing. If the second signal corresponding to the most recently received control signal has been transmitted at n+4 timing, the terminal transmits the second signal corresponding to the currently received control signal at n+4 timing. This method is for the base station and the terminal to reuse the most recently performed transmission/reception operations. This method is applicable for a control signal format that can be transmitted in both the first and second search spaces, and a different method may be used for a specific control signal that can be transmitted only in the second search space. If the terminal detects the control signal that can be transmitted only in the second search space in a search space that is simultaneously the first search space and the second search space, it may regard the corresponding search space as the second search space. For example, the method according to embodiment 4 may be used for detecting the DCI format 1A, and the DCI being transmitted only in the USS such as DCI format 2 may always be detected in the second search space.

Figure 12:
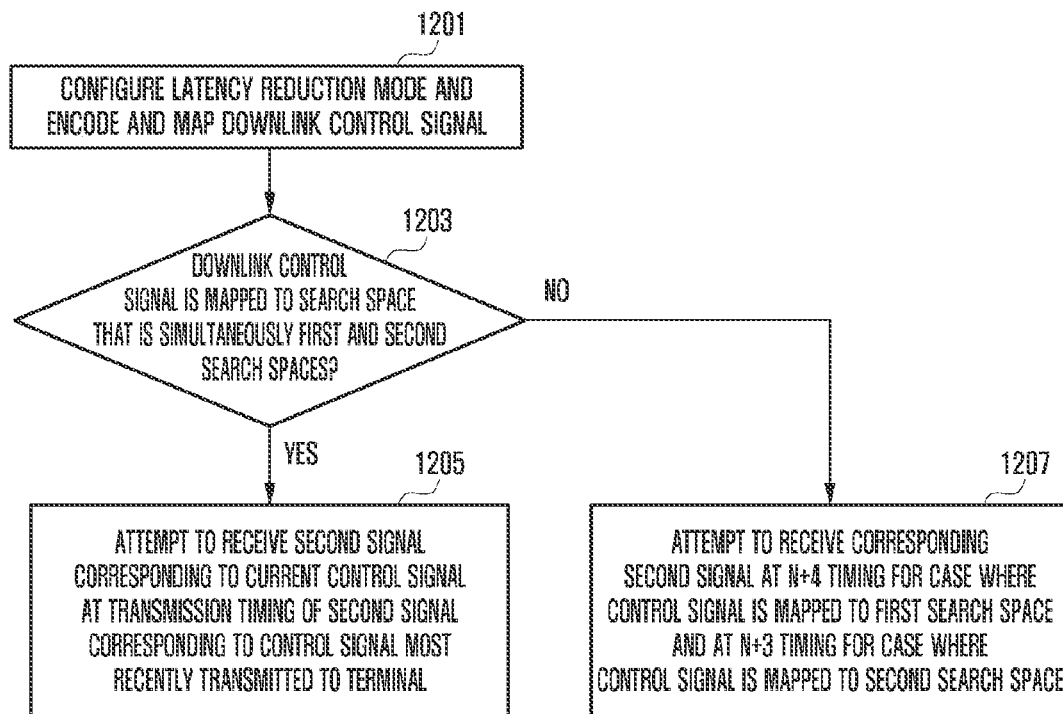
FIG. 12 shows flowcharts illustrating operations of a base station and a terminal according to embodiment 4.
Figure 12:
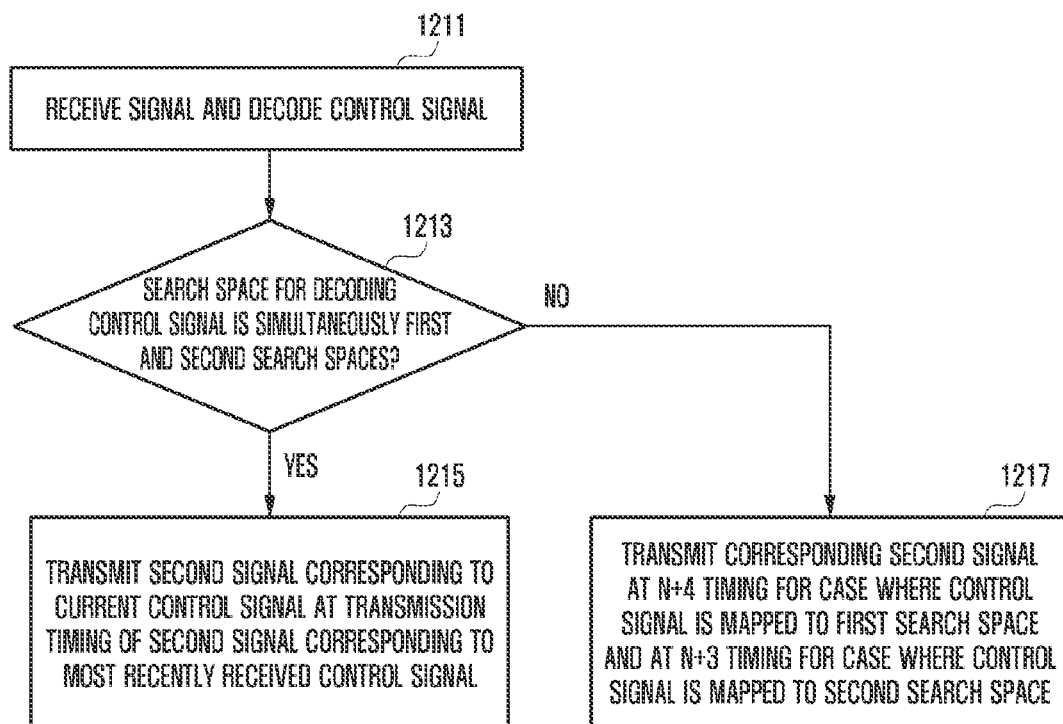

Part (a) of FIG. 12 is a flowchart illustrating an operation of a base station according to an embodiment of the present invention. At step 1201, the base station configures the terminal in the latency reduction mode, encodes the downlink control signal, and maps the control signal. At step 1203, the base station determines whether the search space to which the control signal is mapped is simultaneously the first search space and the second search space. If the search space to which the control signal is mapped is simultaneously the first search space and the second search space, the base station attempts, at step 1205, to receive the second signal corresponding to the current control signal at the transmission timing that has been used to receive the second signal corresponding to the control signal most recently transmitted to the terminal. For example, if the second signal corresponding to a control signal transmitted in the previous subframe for scheduling downlink data to the terminal has been transmitted at n+4 timing, the terminal determines to use the n+4 timing for transmitting the second signal corresponding to the control signal transmitted in the current subframe.

Part (b) of FIG. 12 is a flowchart illustrating an operation of a terminal according to an embodiment of the present invention. At step 1211, the terminal configured in the latency reduction mode receives a signal and performs control signal decoding. The terminal determines at step 1213 whether the search space in which the control signal is detected is a search space that is simultaneously the first search space and the second search space. If it is determined that the search space in which the control signal is detected is a search space that is simultaneously the first search space and the second search space, the terminal transmits, at step 1215, the second signal corresponding to the current control signal to the base station at the transmission timing used for transmitting the second signal corresponding to the most recently received control signal. If it is determined that the search space in which the control signal is detected is not a search space that is simultaneously the first search space and the second search space, the terminal transmits, at step 1217, the corresponding second signal at n+4 timing for the case where the control signal is mapped to the first search space and at n+3 timing for the case where the control signal is mapped to the second search space.

Embodiment 4-1

Embodiment 4-1 is directed to a method for using, when a terminal decodes a downlink control signal successfully in a search space that is simultaneously the first search space and the second search space, a previously used timing for downlink data transmission for a case where a predetermined condition is fulfilled and a pre-agreed timing for a case where the condition is not fulfilled, and the method is described with reference to FIG. 13.

Figure 13:
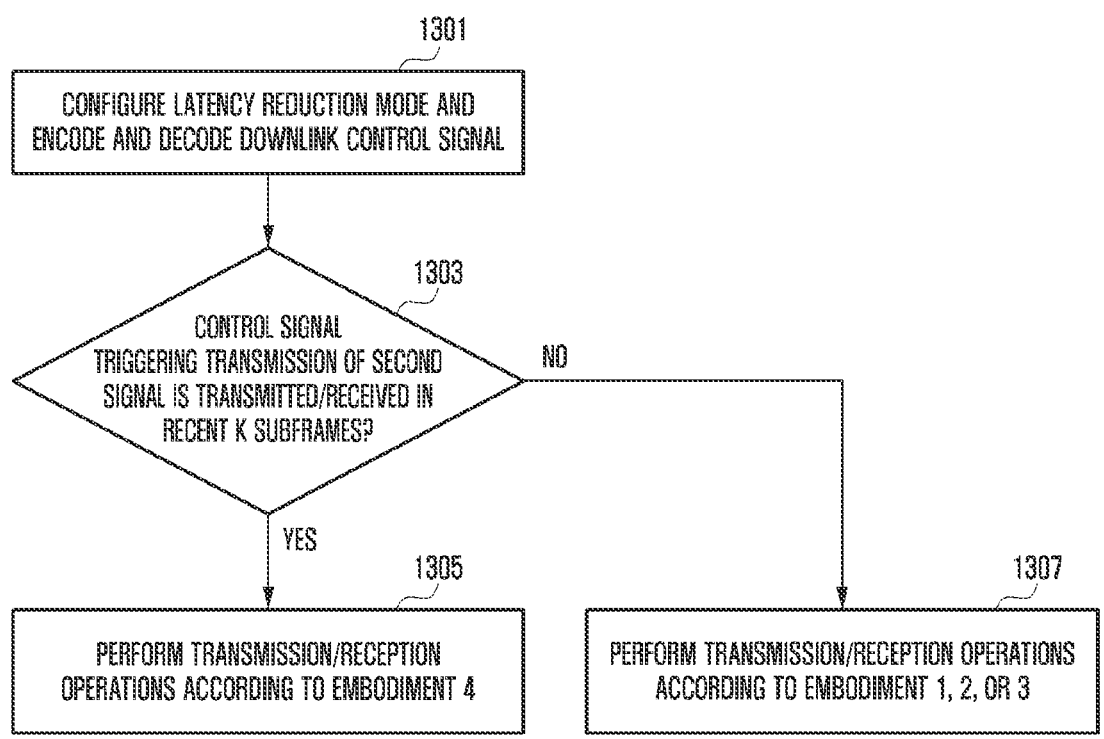
FIG. 13 is a flowchart illustrating operations of a base station and a terminal according to embodiment 4-1.

FIG. 13 is a flowchart illustrating a method for determining a second signal transmission timing between a base station and a terminal according to whether a control signal is transmitted/received in recent subframes. At step 1301, the base station configures the terminal in the latency reduction mode, encodes a downlink control signal, and maps the control signal; the terminal configured in the latency reduction mode receives a signal and decodes the control signal. At step 1303, the base station and the terminal determine whether a control signal triggering transmission of a second signal has been transmitted/received in recent k subframes. Here, k may be a pre-agreed value. For example, k may be set to 4 or 10 or a value indicative of the current radio frame. It may also be possible to set k to a value indicative of the most recent subframe. If a control signal is received in recent k subframes, and the control signal triggers transmission of the second signal, the timing used for transmitting the second signal is reused at step 1305. That is, in this case, the base station and the terminal may operate according to embodiment 4. If no control signal triggering transmission of the second signal is received in recent 4 subframes, the base station and the terminal may perform transmission/reception operations according to embodiment 1, 2, or 3 at step 1307.

Embodiment 5

Embodiment 5 is directed to a method for a base station to receive, when a base station transmits a control signal scheduling downlink data transmission in a search space that is simultaneously the first search space and the second search space, an HARQ ACK feedback or the second signal corresponding to the data, and the method is described with reference to FIG. 14.

Figure 14:
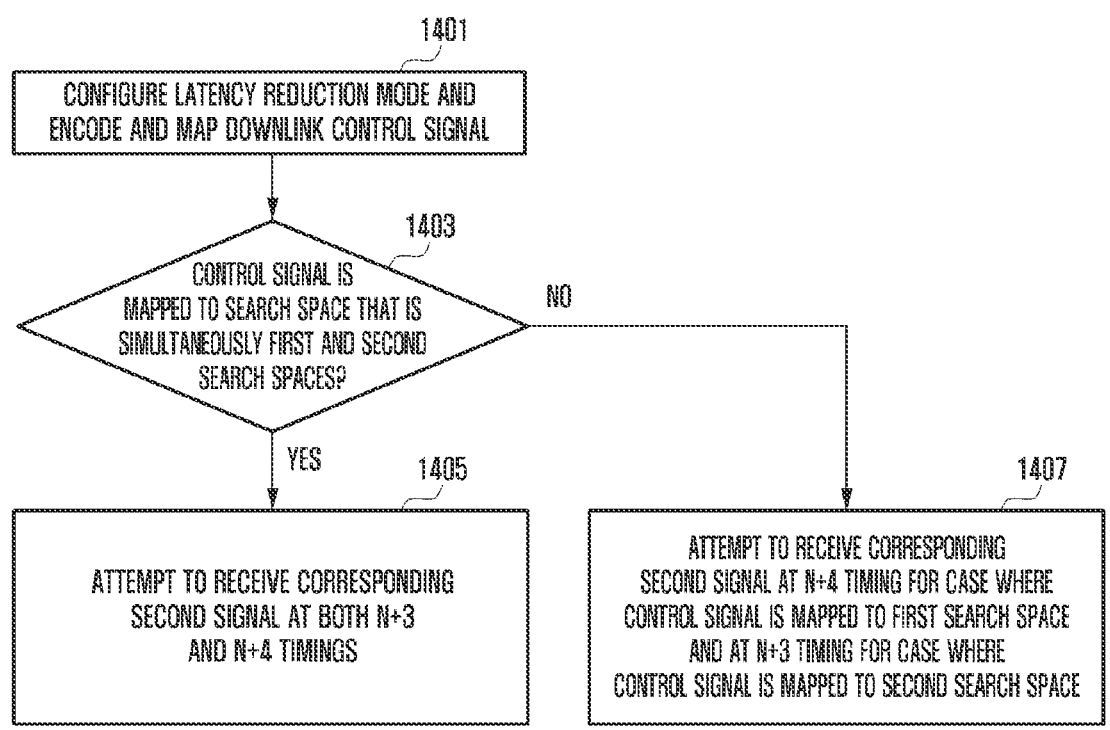
FIG. 14 is a flowchart illustrating an operation of a base station according to embodiment 5.

FIG. 14 is a flowchart illustrating an operation of a base station according to embodiment 5. At step 1401, the base station configures the terminal in the latency reduction mode, encodes a downlink control signal to be transmitted, and maps the control signal. The base station determines whether the search space to which the control signal is mapped is simultaneously the first search space and the second search space. If it is determined that the search space to which the control signal is mapped is simultaneously the first search space and the second search space, the base station may attempt to detect the second signal corresponding to the control signal at both the n+3 timing and the n+4 timing at step 1405. If it is determined that the search space to which the control signal is mapped is not simultaneously the first search space and the second search space, the base station attempts, at step 1407, to detect the second signal at n+4 timing for the case where the control signal is mapped to the first search space and at n+3 timing for the case where the control signal is mapped to the second search space.

This method is applicable in association with a control signal format that can be transmitted in both the first and second search spaces, and a different method may be used in association with a specific control signal that can be transmitted only in the second search space. If the base station has transmitted a control signal (which can be transmitted only in the second search space) in the search space that is simultaneously the first search space and the second search space, it may attempt to detect the second signal corresponding to the control signal only at n+3 timing. For example, the method according to embodiment 5 may be used for transmitting the DCI format 1A and detecting the corresponding second signal, and transmitting a DCI available to be transmitted only in the USS such as DCI format 2 and detecting the corresponding second signal may be performed using the n+3 timing in the latency reduction mode.

The latency reduction mode operation is described in association with the n+3 timing in the above embodiments to help understand the present invention rather than limit the scope of the invention. Thus, the present invention is applicable to systems configured such that the second signal is transmitted at an n+2 or n+3 timing in the latency reduction mode.

Figure 15:
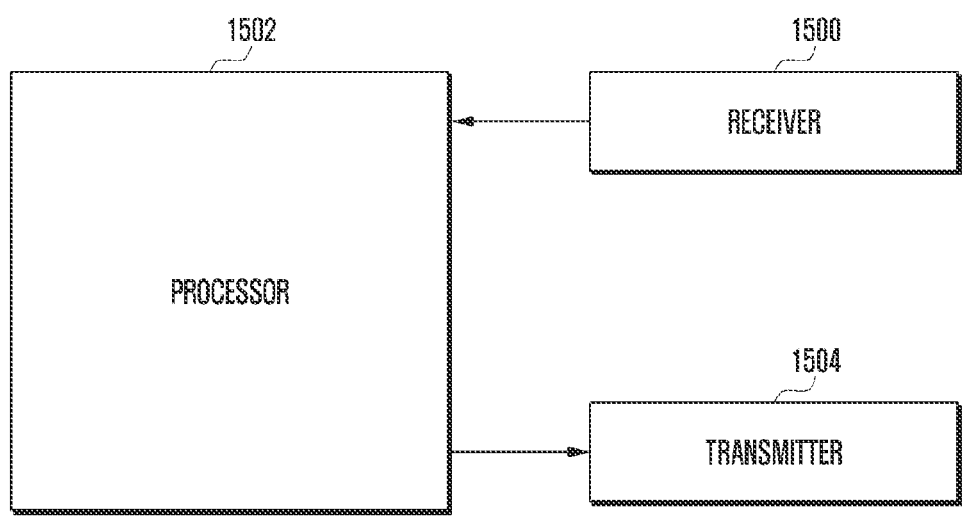
FIG. 15 is a block diagram illustrating a configuration of a terminal according to an embodiment of the present invention.
Figure 16:
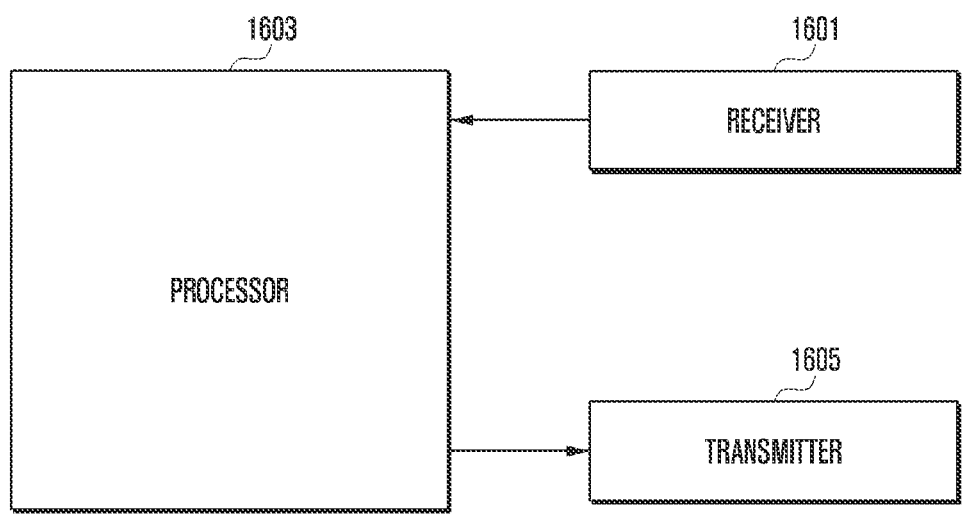
FIG. 16 is a block diagram illustrating a configuration of a base station according to an embodiment of the present invention.

The terminal and the base station, each composed of a transmitter, a receiver, and a processor for implementing the methods of the above embodiments, are depicted in FIGS. 15 and 16, respectively. In order to implement the methods for communication between the base station and the terminal to accomplish a goal for detecting a control signal in association with a search space according to embodiments 1 to 5, the transmitter, receiver, and processor of each of the base station and the UE should operate as described in the respective embodiments.

FIG. 15 is a block diagram illustrating a configuration of a terminal according to an embodiment of the present invention. As shown in FIG. 15, the terminal may include a processor 1502, a receiver 1500, and a transmitter 1504. According to an embodiment of the present invention, the receiver 1500 and the transmitter 1504 may be collectively referred to as a transceiver. The transceiver may transmit and receive signals to and from a base station. The signals may include control information and data. The transceiver may include a radio frequency (RF) transmitter for frequency-up-converting and amplifying a signal to be transmitted and an RF receiver for low-noise-amplifying and frequency-down-converting a received signal. The transceiver may output the signal received over a radio channel to the processor 1502 and transmit the signal output from the processor 1502 over the radio channel. According to an embodiment of the present invention, the processor 1502 may control overall operations of the UE. For example, the processor 1502 may control the receiver 1500 to receive signals including a control signal, determine a DCI format for decoding in association with the search space, and decode the DCI format. The processor also ascertains the search space in which the DCI is detected and determines the transmission timing of the second signal. Afterward, if it is necessary to transmit the second signal corresponding to the control signal, the transmitter 1504 transmits the second signal at the timing determined by the processor.

FIG. 16 is a block diagram illustrating a configuration of a base station according to an embodiment of the present invention. As shown in FIG. 16, the base station may include a processor 1603, a receiver 1601, and a transmitter 1605. According to an embodiment of the present invention, the receiver 1601 and the transmitter 1605 may be collectively referred to as a transceiver. The transceiver may transmit and receive signals to and from a terminal. The signals may include control information and data. The transceiver may include an RF transmitter for frequency-up-converting and amplifying a signal to be transmitted and an RF receiver for low-noise-amplifying and frequency-down-converting a received signal. The transceiver may output the signal received over a radio channel to the processor 1603 and transmit the signal output from the processor 1603 over the radio channel. The processor 1603 may control overall operations of the base station as described above in the embodiments of the present invention.

The embodiments disclosed in the specification and drawings are proposed to help explain and understand the present invention rather than to limit the scope of the present invention. It is obvious to those skilled in the art that modifications and changes can be made thereto without departing from the spirit and scope of the present invention. If necessary, the embodiments may be combined in whole or in part. For example the base station and the terminal may operate according to a combination of parts of embodiments 1 and 2 of the present invention. Although the embodiments have been directed to the LTE/LTE-A system, the present invention can include alternative embodiments directed to other systems such as the 5G NR system without departing from the technical sprit of the present invention.

In the embodiments of the present inventions, the components are described in singular or plural forms depending on the embodiment. However, the singular and plural forms are selected appropriately for the proposed situation just for explanatory convenience without any intention of limiting the present invention thereto; thus, the singular form includes the plural forms as well, unless the context clearly indicates otherwise.

Although the description has been made with reference to particular embodiments, the present invention can be implemented with various modifications without departing from the scope of the present invention. Thus, the present invention is not limited to the particular embodiments disclosed, and it will include the following claims and their equivalents.

The invention claimed is:

1. A method performed by a terminal in a wireless communication system, the method comprising:
receiving, from a base station, information configuring a plurality of search spaces for the terminal;
identifying that a common search space (CSS) and a user equipment (UE) specific search space (USS) overlap;
receiving downlink control information by monitoring a physical downlink control channel (PDCCH) based on only the CSS, in case that the CSS and the USS overlap; and
transmitting, to the base station, a physical uplink shared channel (PUSCH) transmission based on the downlink control information received on the PDCCH corresponding to the CSS.

2. The method of claim 1, wherein the USS is not monitored in case that the CSS and the USS overlap.

3. The method of claim 1, further comprising receiving, from the base station, information indicating that an advanced processing time is configured for the terminal,
wherein the PUSCH transmission is transmitted to the base station in a transmission timing identified based on the advanced processing time.

4. The method of claim 3, wherein a processing time according to the advanced processing time is shorter than a processing time without the advanced processing time.

5. The method of claim 1, wherein the information is received via a higher layer signaling.

6. A method performed by a base station in a wireless communication system, the method comprising:
transmitting, to a terminal, information configuring a plurality of search spaces for the terminal;
identifying that a common search space (CSS) and a user equipment (UE) specific search space (USS) overlap;
transmitting downlink control information on a physical downlink control channel (PDCCH) based on only the CSS, in case that the CSS and the USS overlap; and
receiving, from the terminal, a physical uplink share channel (PUSCH) transmission based on the downlink control information transmitted on the PDCCH corresponding to the CSS.

7. The method of claim 6, wherein the downlink control information is not transmitted on the USS in case that the CSS and the USS overlap.

8. The method of claim 6, further comprising transmitting, to the terminal, information indicating that an advanced processing time is configured for the terminal, and
wherein the PUSCH transmission is received from the terminal in a transmission timing identified based on the advanced processing time.

9. The method of claim 8, wherein a processing time according to the advanced processing time is shorter than a processing time without the advanced processing time.

10. The method of claim 6, wherein the information is transmitted via a higher layer signaling.

11. A terminal in a wireless communication system, the terminal comprising:
a transceiver configured to transmit and receive a signal; and
a controller configured to:
receive, from a base station, information configuring a plurality of search spaces for the terminal,
identify that a common search space (CSS) and a user equipment (UE) specific search space (USS) overlap,
receive downlink control information by monitoring a physical downlink control channel (PDCCH) based on only the CSS, in case that the CSS and the USS overlap, and
transmit, to the base station, a physical uplink shared channel (PUSCH) transmission based on the downlink control information received on the PDCCH corresponding to the CSS.

12. The terminal of claim 11, wherein the USS is not monitored in case that the CSS and the USS overlap.

13. The terminal of claim 11, wherein the controller is further configured to receive, from the base station, information indicating that an advanced processing time is configured for the terminal, and
wherein the PUSCH transmission is transmitted to the base station in a transmission timing identified based on the advanced processing time.

14. The terminal of claim 13, wherein a processing time according to the advanced processing time is shorter than a processing time without the advanced processing time.

15. The terminal of claim 11, wherein the information is received via a higher layer signaling.

16. A base station in a wireless communication system, the base station comprising:
a transceiver configured to transmit and receive a signal; and
a controller configured to:
transmit, to a terminal, information configuring a plurality of search spaces for the terminal,
identify that a common search space (CSS) and a user equipment (UE) specific search space (USS) overlap,
transmit downlink control information on a physical downlink control channel (PDCCH) based on only the CSS, in case that the CSS and the USS overlap, and
receive, from the terminal, a physical uplink share channel (PUSCH) transmission based on the downlink control information transmitted on the PDCCH corresponding to the CSS.

17. The base station of claim 16, wherein the downlink control information is not transmitted on the USS in case that the CSS and the USS overlap.

18. The base station of claim 16, wherein the controller is further configured to transmit, to the terminal, information indicating that an advanced processing time is configured for the terminal, and
wherein the PUSCH transmission is received from the terminal in a transmission timing identified based on the advanced processing time.

19. The base station of claim 18, wherein a processing time according to the advanced processing time is shorter than a processing time without the advanced processing time.

20. The base station of claim 16, wherein the information is transmitted via a higher layer signaling.

* * * * *